(12) United States Patent
Kieboom et al.

(10) Patent No.: US 11,734,645 B2
(45) Date of Patent: *Aug. 22, 2023

(54) AUTOMATED SYSTEMS AND METHODS FOR PROCESSING RETAIL PRODUCT RETURNS AND EXCHANGES

(71) Applicant: Pollen Technologies Inc., Atlanta, GA (US)

(72) Inventors: Spencer Kieboom, Marietta, GA (US); Mark Hart, Oak Ridge, NC (US)

(73) Assignee: POLLEN TECHNOLOGIES INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,137

(22) Filed: May 11, 2022

(65) Prior Publication Data
US 2022/0270040 A1 Aug. 25, 2022

Related U.S. Application Data

(63) Continuation-in-part of application No. 17/096,116, filed on Nov. 12, 2020, now Pat. No. 11,587,022.

(51) Int. Cl.
*G06Q 10/0837* (2023.01)
*G08G 1/00* (2006.01)
*G06Q 10/0833* (2023.01)

(52) U.S. Cl.
CPC ..... *G06Q 10/0837* (2013.01); *G06Q 10/0833* (2013.01); *G08G 1/202* (2013.01)

(58) Field of Classification Search
CPC ........... G06Q 10/0837; G06Q 10/0834; G06K 7/1417; H04W 4/023
(Continued)

(56) References Cited

U.S. PATENT DOCUMENTS

2006/0149577 A1* 7/2006 Stashluk, Jr. ........ G06Q 30/016 705/13
2016/0364688 A1* 12/2016 Vakneen ............ G06Q 10/0833
(Continued)

OTHER PUBLICATIONS

"An analysis of single item inventory systems with returns" Published by Cornell University (Year: 1981).*

*Primary Examiner* — Zeina Elchanti
(74) *Attorney, Agent, or Firm* — Cowan, Liebowitz & Latman, P.C.; Mark Montague; Daniel Basov

(57) ABSTRACT

Systems and methods that automatically process returns or exchanges. Upon receipt of product return requests, the system obtains information about the products and customers to facilitate the returns, aggregates multiple return requests and carries out optimization processing to generate optimized routes for product pickups. Logistic partners evaluate the routes for acceptance. Once accepted, a driver proceeds to a product pickup location and conducts an inspection of the products, which includes photographing the products and placing the products in special uniquely identified containers. The picked-up products are transported to a designated drop-off location, and a second inspection of the products is carried out. Upon successful inspection, retailers are informed of the inspection results and proceed to initiate a refund or product exchange. Refunds or exchanges may be initiated after the first inspection. Other features and functions are employed in various embodiments.

28 Claims, 15 Drawing Sheets

(58) Field of Classification Search
USPC .......................................................... 705/341
See application file for complete search history.

(56) References Cited

U.S. PATENT DOCUMENTS

2021/0312216 A1\* 10/2021 De Gouveia ...... G06Q 10/0833
2021/0383319 A1\* 12/2021 Brow ............... G06K 19/06028

\* cited by examiner

US 11,734,645 B2

AUTOMATED SYSTEMS AND METHODS FOR PROCESSING RETAIL PRODUCT RETURNS AND EXCHANGES

REFERENCE TO RELATED APPLICATION

This is a continuation-in-part of U.S. patent application Ser. No. 17/096,116, filed Nov. 12, 2020, which is incorporated herein by reference in its entirety.

FIELD OF THE INVENTION

The present invention relates to automated systems and methods for retail product returns and exchanges and, more particularly, is directed to the automated scheduling, management, tracking, pickup, and transport of products and other things that are intended to be returned by consumers/customers, as well as the automated handling/processing of products to be exchanged.

BACKGROUND OF THE INVENTION

Products are returned to physical "brick and mortar" retail stores and online retailers by customers on an extremely regular basis. According to public records, roughly 10% of products purchased in brick-and-mortar stores are returned, whereas as much as 30% of goods purchased from online retailers are returned or exchanged. Historically, retailers have charged customers restocking fees for returned goods thereby providing customers with a refund or store credit for the amount of the product purchase less the restocking fee. More recently, most retailers have no restocking fee.

In the online environment, customers can return goods back to the retailer via the U.S. Postal Service, Federal Express ("FedEx"), the United Postal Service ("UPS"), DHL, or other similar service. Some online retailers allow customers to return products in person to a designated drop-off location, a "locker" or at a retail partner location. Credit in the form of a refund or store credit is provided upon the retailer's receipt and inspection of the returned product. In the case of a desired exchange, the new product (the "exchanged product") designated by the customer to be received in exchange for the returned product is not shipped until the returned product is received and inspected by the retailer. Oftentimes, exchanges are not possible if the customer returns a product at a locker.

Current return and exchange systems and processes in place often result in the accrual of credit card transaction fees for retailers as well as incurring other expenses associated with the return or exchange.

Third parties on occasion are employed to facilitate returns and exchanges. For instance, a third-party company commences the purchase of a replacement product and, upon return of the original product to the retailer, the third-party is provided with a credit or other monetary value from the retailer. However, additional fees are charged, often by the third-party. In many instances, the third party is financially responsible to the retailer for both the original product and the replacement product. Hence, the third party may incur a loss if the originally purchased product is not properly returned.

In recent times, due to intense competition, many retailers have a virtual "no questions asked" return policy along with free shipping of the product to be returned. Hence, retailers incur the cost of shipping of products to be returned (or exchanged) along with other costs associated with the handling and processing of returned products. In many instances, retailers inform customers to simply keep the product to be returned, thus avoiding costs associated with the return of the product, inspection of the product, restocking/storage/resale of the product, and/or disposal of the product.

As is well known, existing product return/exchange systems require consumers to transport unwanted products, result in undesired credit card transaction fees, and other undesired outcomes. In cases when product returns go awry, such as when returned products are damaged or lost during transport, additional undesirable costs and efforts are incurred by both the retailer and customer (and third parties who are involved in the return process). Customer dissatisfaction with the retailer also is an inevitable result of any problem that occurs during the return process.

In light of the above-mentioned problems and shortcomings, and other problems and shortcomings not mentioned herein, in the retail product return and exchange process, there is a need that exists for improved systems and methods that enable customers to return products and retailers to facilitate such returns in manners that avoid or at least minimize some or all of these problems.

OBJECTS AND SUMMARY OF THE INVENTION

Desired improvements to current retail product return systems include one or more of the following: reducing the cost of processing items being returned to retailers; earlier detection of product quality issues; expediting the timeline for retailers to initiate a refund or credit; expediting the exchange of products; repurposing unwanted items in a sustainable fashion; keeping some returned products out of the secondary market; dramatically reducing the amount of waste resulting from the disposal of returned products; among other known desired improvements.

To achieve one or more of these desired improvements and/or to address one of more of the aforementioned problems and shortcomings with existing processes and systems, the following are brief summaries of some of the various embodiments of the present invention and aspects/features thereof.

According to the present invention, a method for automatically processing a return or exchange comprises receiving (e.g., by a company implementing the invention) an electronic request (e.g., from a retailer) to initiate the return of a product by a customer to the retailer of that product, obtaining product information identifying information about the product, associating the return initiation request for the product with return information comprising the product information, a pickup address, a pickup time window, customer information and drop-off information (and other information), automatically aggregating the requested return with other return requests and optimizing the aggregated requests for returns of multiple products, generating pickup and delivery route data for the aggregated and optimized requests (and then transmitting such information to one or more transport services), receiving an acceptance notification from a transport service provider who has accepted the request, later receiving from the transport service provider a notification ("first notification") regarding the pickup status of one or more products in the aggregated and optimized requests, the first notification including validation data pertaining to inspection information about the products. The process then continues by, after receiving the first notification, creating a unique digital fingerprint record for each picked-up product and updating a digital bin having a plurality of digital fingerprints for the products associated with the generated pickup and delivery route data accepted by the transport service provider, transmitting a first status to the customer or the retailer at a time of receiving the first notification, the first status including at least data indicating successful pickup of one or more products by the transport service provider. Thereafter, receiving a second notification regarding a drop-off status by the transport service provider of the products at a drop-off location, where the second notification represents receipt of the products at the drop-off location by the transport service provider. Then, updating the digital bin and assigning a tracking number or receiver number after the second notification is received, and transmitting a second status to the retailer after receiving the second notification, the second status including product status data corresponding to the validation data pertaining to inspection of the product. The retailer then may issue a refund or exchange if not already initiated.

As an aspect of the invention, the method further comprises determining whether the associated return initiation request and return information includes minimum data requirements including an address for pickup of the product, an address for delivery of the product, the product information, customer contact information, and a time window for product pickup. The process then includes generating and electronically transmitting, when the minimum data requirements are not met, a request to resubmit the electronic request to initiate return of the product with additional information, and generating, when the minimum data requirements are met, a database record id for the request and performing aggregation of the requested return with other return requests and optimization of the aggregated returns.

As a further aspect of the invention, automatically aggregating the requested return with other return requests and optimizing the aggregated requests for returns of multiple products is based on a computerized analysis of an authorized retail partner, a delivery destination, a pickup date and time, and pickup location data.

As another aspect of the invention, automatically aggregating the requested return with other return requests and optimizing the aggregated requests for returns of multiple products is based on a computerized evaluation of proximity and mileage limits and size or weight limits set by one or more delivery partners.

As an additional aspect of the invention, the method further comprises communicating with at least one driver and determining whether the driver has a designated bag that includes a unique ID that corresponds to the product to be picked up by the driver, directing the driver to obtain the designated bag at an indicated location prior to product pickup if it is determined that the driver does not have the designated bag, and providing product pickup instructions to the driver after receiving confirmation that the driver obtained the designated bag.

As yet a further aspect of the invention, the first notification received from the transport service provider represents completion of an inspection by a driver who picked up the product, the inspection including taking one or more photographs of the product by the driver, and the first notification including data corresponding to the one or more photographs of the product.

As yet another aspect of the invention, the method further comprises receiving from the transport service provider a unique ID representing a unique container into which a driver of the transport service provider has placed the product picked up by the driver, and associating the return initiation request of the product with the received unique ID.

As yet an additional aspect of the invention, the received second notification includes second validation data pertaining to a second inspection of the product conducted at the drop-off location, and the product status data in the transmitted second status to the retailer pertains to the second inspection of the product conducted at the drop-off location, and includes an indication of whether or not refund or exchange processing can be initiated depending on results of the second inspection.

As still yet a further aspect of the invention, the method further comprises initiating, if the first notification is received but the second notification is not received within a predetermined time period, an audit and tracking of the product, and generating and transmitting product status notifications to the customer and retailer indicating that the product has been picked up from the customer but has not been delivered.

As still yet another aspect of the invention, the method further comprises receiving from the transport service provider an incomplete pickup notification comprising data that indicates that one or more products to be picked up were not found at the pickup address or that indicates that a quantity of products picked up at the pickup address does not match a quantity of products included in the aggregated and optimized requests corresponding to products to be picked up at the pickup address, and generating and transmitting product status notifications to the customer and the retailer indicating information contained in the incomplete pickup notification received from the transport service provider.

As yet further aspect of the invention, the system includes creating a unique identification, referred to as a "Digital Fingerprint" for the pickup transaction, and tracking the chain-of-custody of the pickup item during the transaction. The unique fingerprint for the transaction can be established and maintained using a unique id in the PRAE database for the product and/or transaction, NFT block chain identification and association, use of encrypted keys or other known techniques that create a unique identification for the product and/or transaction and maintain it through the PRAE system process steps, and particularly when the custody of the product changes from the customer to driver, and then to the receiving clerk at the drop-off location.

As yet further aspect of the invention, the system employs artificial intelligence (AI) methodologies/processes, including AI iterative and self-learning processes for predictive analysis, which reduce fraud, abuse and facilitate faster and more efficient exchange, upgrade or return of purchased products.

As yet further aspect of the invention, the system employs AI and visual image recognition software to perform additional automated product verification and/or authentication at the point of pickup. He verification steps may utilize some unique identification features or processes on the product being picked up, as, for example, a hologram, identification code or NFT verification processing, to confirm the authenticity of the returned product. The system and/or AI may also instruct the driver to perform some additional product verification or authentication steps based on the AI analysis and image recognition processing of the picked-up product.

As yet further aspect of the invention, the system employs AI and/or computerized analytics to present the consumer with different optional dates for delivery, with different prices, based on evaluation and analysis of the past surge and other pricing factors for various Gig partners, and/or based on the supply and demand at different locations, times and distances to the pickup and drop-off locations.

As yet further aspect of the invention, the system employs AI and/or computerized analytics to determine the best ways to add additional offers, discounts, rebates, upgrades and other types of promotions or products as part of the communications with the consumer during the pickup and delivery process. It may also offer this option to the retail partners, and receive and automatically deliver such offers, discounts, rebates, upgrades or other types of promotions to the consumers who utilize the PRAE system.

As yet further aspect of the invention, the system employs AI and/or software to determine and coordinate the pickup of the exchanged product with the replacement item. If such direct exchange is possible, the system will direct the driver to pickup the replacement item from a store or warehouse of the participating retail partner, deliver it to the consumer and perform product exchange at the time of the scheduled pickup.

In accordance with system embodiments of the invention, the aforementioned steps are carried out by the automated system via computing systems with associated processors, memory, transmission capabilities, and other electronics to facilitate such steps. The AI or pre-programmed processes may be utilized for predictive analysis to reduce fraud, abuse and facilitate faster exchange or return of the products, as well as for implementing other features of the invention.

In accordance with another method embodiment of the invention, a method of automatically processing return of products comprises the steps of receiving an aggregated and optimized set of return requests for returns of multiple products, evaluating the received set of return requests based on one or more conditions, and generating a route for the pickup and delivery of the set of products to be returned, transmitting an acceptance notification and a pickup and delivery route data for the accepted set of product returns, selecting one or more pickup drivers for the accepted set of returns, the drivers being selected from a prospective pool of drivers based at least partially on a driver's proximity to the location of the products, receiving a confirmation from the driver who is assigned to the pickup for the route, dispatching the assigned driver to the pickup location, transmitting inspection information to the driver regarding at least one product to be picked up, transmitting a first notification after the driver performs a visual inspection of the picked up product based on inspection instructions, takes an image of the picked up product, places the product into a designated container including an ID code associated therewith, and scans the ID code using a mobile device, checking whether the driver has more products to be picked-up on the assigned route, directing, if all products on the assigned route have been picked up, the driver to at least one drop-off location within a set time period for the drop-off, and transmitting a second notification after the driver has completed drop-off, and after receiving the ID code on the container, where the products have been dropped-off, the second notification indicating that an exchange or refund of the product may be commenced by the retailer if not already initiated.

As an aspect of this method, the method further comprises cancelling the product pickup if the driver does not send an indication of completing the pickup in a predetermined time interval, or when the driver sends a cancellation request prior to driving to the pickup location, reassigning the product pickup to another driver if the received notification is a rejection or cancellation of the pickup or assigned route, and sending notifications after at least one driver has been assigned to the route for pickup, after the assigned driver has completed the pickup and after the assigned driver completed the drop-off.

The aforementioned aspects summarized in connection with the first method embodiment likewise all are aspects of this second embodiment.

The above-summarized embodiments and aspects are illustrative and non-limiting. Additional embodiments and aspects/features thereof are further described herein.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PRESENT INVENTION

Figure 1:
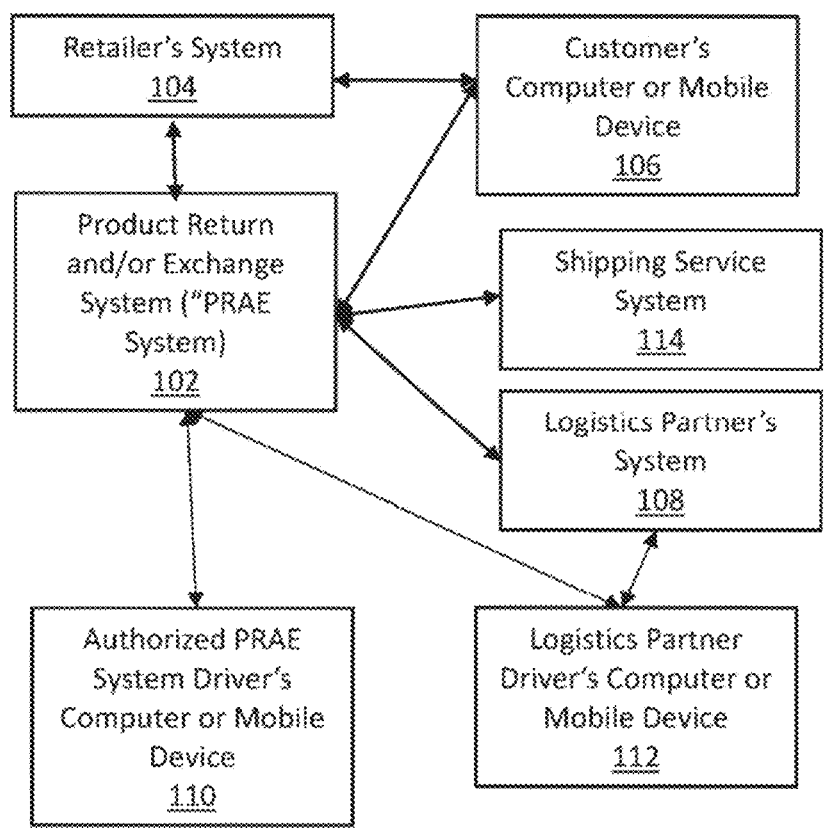
FIG. 1 schematically illustrates the flow of communications and exchange of information between different entities involved in the scheduling, management, pickup and delivery of products intended to be returned and/or exchanged by customers in accordance with the present invention.

The present invention pertains to automated systems and methods that enable customers and retailers to easily facilitate the return of products and goods purchased or otherwise obtained along with facilitating the easy exchange of products. As briefly mentioned above, current systems and processes are cumbersome, prone to problems, slow, among other undesired characteristics. As described herein, the present invention offers a number of advantages over existing systems, including greater efficiency in processing requests and carrying out the various efforts in the process, greater automation in implementation of steps and communication to the various entities involved, quicker crediting of monetary value to customers of products being returned, quicker processing of exchanges so that customers receive substitute products faster than currently achieved, better tracking of products being returned . . . from the customer all the way to the retailer, quicker assessment/inspection of products in the return process, among other advantages and benefits that are achieved.

Definitions

In the discussion herein, the following definitions of various terms are provided for various purposes, including establishing broad definitions of such terms and for other reasons as set forth below.

The terms "customer," "customers," "consumer" and "consumers," and the like are used interchangeably herein.

The terms "product," "products," "item," "items," "purchased good," "goods," and the like are interchangeably used herein to refer to one or more products or things that are intended to be returned or are in the process of being returned.

The terms "transmission," "communication," "transfer," and the like are intended to include direct or indirect communication, and wired or wireless communication, and may be achieved via any known manner known. Unless otherwise stated, communication between devices include wired or wireless communication, include direct communication (e.g., Bluetooth communication) in certain embodiments and include indirect communication in other embodiments. Indirect communication includes communication between intermediary devices, computing systems, communication portals and other devices known in the art.

Input by a user of a computerized device is intended to be broadly construed and may include any action or a set of actions by the user that are perceived by a mechanical, electrical, optical, audio, or other device capable of receiving a human-provided output, such as a "click" on a mouse, depression of a button, a selection or depression of a key on a keyboard or keypad (including a virtual keyboard or keypad), a contact on a touch-screen type device, a voice command received by an appropriate computing device, and/or a physical gesture also received by an appropriate computer device (e.g., devices employing a camera or other types of sensors that detect movement), among other forms of input to such devices.

The types of devices that can receive and process the transmission, communication, or other form of input by a user includes, as non-limiting examples, a keyboard, touch-screen, mouse, input device of a computer, smart phone, tablet or other mobile electronic device, a remote control, key fob, camera system coupled to a suitable computing device, computing system that employs a microphone, movement/motion sensors, optical systems, and devices/systems that include a combination of any of the foregoing.

Output from a computing device and the like to a user is intended to be broadly construed and may include any action or a set of actions by the computing device (with or without the assistance of associated devices) perceivable by a user and includes, as non-limiting examples, information on a display or visual output on another device, audio output (e.g., from a speaker), tactile output (human-perceivable movement), and other known manners where a computing device is able to convey information to a human.

The terms "smart phone," "mobile phone," "mobile device," "computerized device," "computer," "computing device" and the like as used herein are used interchangeably herein and includes devices capable of being programmed and, as appropriate, have communication capability and/or are used to facilitate/carry out the functions, steps and/or processes described herein and include, as non-limiting examples, desktop computers, portable computers, laptops, smart phones, tablets, smart watches, and other appropriate technological devices.

As illustrated, the present invention is not limited to the use of a single operator, a single platform, a single type of device, etc. Hence, the present invention is applicable to any type of device capable of carrying out the various functions as described herein (within the relevant embodiment) and applicable to any operator.

The terms "return container," "designated bag" or simply "container" or "bag" and the like refer to the container, bag, box, envelope, and other thing into which a product to be returned may be placed. Such items may be of different sizes and shapes and may be made from any suitable material(s) sufficient to hold the product or multiple products to be returned.

Discussions pertaining to a computer, server, processor, electronic device, computing device, and the like shall include a combination of multiple devices. Language relating to a computer, computing device, electronic device, and the like includes any suitable combination of computing devices, including servers, systems, databases, controllers, engines, interfaces, or other types of devices generally recognized to be used within or associated with computing devices.

Computer, computing devices and electronic devices employ a processor (e.g., a CPU or controller) configured to execute software instructions that are stored on a tangible, non-transitory computer readable storage medium. Computers, computing devices and electronic devices, along with their associated processors and the tangible, non-transitory computer readable storage mediums are well known in the art. The present invention also is described as carrying out certain processes, steps and functions. Such processes, steps and functions are carried out by appropriate computers, computing devices, electronic devices, processors or other known components capable of carrying out those processes or steps. Hence, even if structural devices are not mentioned within each of the various sections presented herein, the foregoing mentioned structural devices, such as a processor, computer, computing system, electronic device, etc., represent the structures that may be used in the present invention.

The present invention is described as a multitude of processes in terms of functions, steps, objectives, and other things, and given the discussion herein, and in light of the discussion herein, a person of ordinary skill in the art to which the present invention applies is able to generate the corresponding code, software applications and "apps." Custom apps may be developed to facilitate these functions wherein a user is simply able to push a virtual button on his/her smart phone (or other device) and then the app does the rest, with the assistance of remote servers/systems as discussed herein.

The server or processors may employ artificial intelligence (AI) software to perform various analytics processes, including predictive analytics offered to retail partners, and also as part of the product authentication and pickup verification process. The added authentication and verification of the picked-up product helps reduce the abuse, instances of fraud and offers additional security and confidence for each exchange and return transaction (particularly with luxury goods).

Since technology for enabling communication between devices, whether direct or indirect, and whether via the Internet or other methodology are well known in the art, detailed descriptions of such technologies and methodologies are not provided herein in order to avoid obscuring the inventive subject matter described herein.

Overall System and Benefits

The present invention entails an automated Product Return And Exchange system, sometimes referred to herein for convenience as the "PRAE System." The embodiments of the invention described herein provide greater efficiency and result in cost and waste reduction. As described, various embodiments of the invention provide for more efficient and accurate exchange processing by auditing/inspecting products to be returned prior to shipping/transport, among the other advantageous features and aspects described herein. As also described, in the context of enabling consumers to conduct exchanges, auditing products to be returned prior to shipping enables retailers to send replacement products far earlier in the return process than otherwise currently is carried out.

The PRAE System of the present invention provides for product exchanges in a more "organic" manner, similar to how customers exchange products in actual retail stores. In actual retail stores, customers ordinarily are not charged for exchanges. Also, in an actual retail store, the retailer's representative (e.g., cashier, salesperson, etc.) identifies the item being returned and confirms that the customer-selected new product is comparable or equivalent before authorizing the exchange. The present invention, as described herein, emulates the in-store exchange process in order to provide a number of benefits to both retailers and customers.

These benefits include: (1) reducing processing costs; (2) reducing transaction fees; (3) quicker determination of quality and other issues during the return process; (4) expediting the time to provide exchange products; (5) enabling the repurposing of returned items, preferably in a sustainable fashion; (6) preventing or minimizing the introduction of returned products into secondary markets; (7) reducing waste in the disposal of returned products; (8) other benefits as mentioned herein; and (9) additional benefits that would be appreciated and/or realized by the present invention.

The General System

FIG. 1 schematically illustrates the flow of communications and exchange of information between different entities involved in the scheduling, management, pickup and delivery of products intended to be returned and/or exchanged by the customer in one or more embodiments of the invention. PRAE System 102 of the present invention communicates with various entities via any manner known in the art, whether via wired or wireless communication. As illustrated in FIG. 1, PRAE System 102 communicates with retailer systems 104, customer computing devices 106, logistics partner systems 108, and shipping services systems 114.

Each logistics partner 108 as discussed herein is sometimes referred to herein as a "Gig partner." A "Gig partner" includes ride-share services (e.g., Uber services, Lyft services, etc.) and retail delivery services, such as food delivery services (e.g., DoorDash services, GrubHub services) and other forms of delivery services. Shipping services 114 include the U.S. Postal Service, UPS, FedEx, DHL, and the like.

Communication between a retailer system 104 and PRAE System 102 of the invention is achieved via an application programming interface (API) through which the retailer may expose its data. In other embodiments, the PRAE System provides an API, which the retailer's system uses to access data housed within the PRAE System. In further embodiments, communication between retailer system 104 and the PRAE System is carried out in other manners known in the art.

In the processes of the invention, customers interact with a retailer system 104 and the PRAE System via each customer's computing device, smart phone, tablet, and any other portable or non-portable system known in the art.

As further schematically illustrated in FIG. 1, updates, notifications, and/or alerts intended for a customer is transmitted by way of an update to the status of the return/exchange within the retailer's system 104 that is accessible via the customer's computing device 106. Customers may enable "push notifications" or "text notifications" from the retailer's system 104, which in turn enables the retailer's system to send an alert or text message to the customer's computing device 106. Customers may designate other devices to receive such alerts, text messages, etc. In further embodiments, customers receive updates, notifications, and/or alerts directly from the PRAE System.

The PRAE System and all relevant data pertaining to the present invention is cloud-based, with regular backups and security measures carried out in manners known in the art in order to minimize disruptions, outages, and improper data extraction. If desired, the PRAE System of the present invention may also be (or, instead, be) disposed locally.

As discussed herein, the PRAE System of the invention stores all relevant information for each transaction (i.e., return or exchange), including all information in possession of the retailer of the product, information collected by the driver/transport system, and other relevant information. In one embodiment, product return information pertaining to a respective return/exchange is extracted/deleted from the PRAE System (and all applicable storage devices) after a set period of time for additional, known benefits, including minimization of data extraction in the event of a data breach.

In certain embodiments, data pertaining to a return/exchange is maintained only while needed and thus is extracted/deleted shortly after completion of the return/exchange. In one embodiment, data is removed immediately upon receipt by the PRAE System of confirmation that the returned product is successfully delivered to the retailer's designated return address. In other embodiments, all data is maintained to facilitate long-term analysis of returns, whereby the use of artificial-intelligence methodologies (or other types of methodologies) may be employed to identify trends, fraudulent activity, and other beneficial pieces of information.

In accordance with the invention, the PRAE System obtains and maintains retailer-related data. As described herein, the PRAE System authorizes drivers, shipping services, and other entities to facilitate the inventive processes described herein.

The retailer information may include the name of the retailer, retailer contact information, certain preferences identified by the retailer related to the return including the name of the driver, driver contact information, certain preferences identified by the driver related to the return and/or exchange process, etc. The shipping service information may include the name of the shipping service, shipping service contact information, etc. In some embodiments, the retailer information, the PRAE System authorized driver information, the shipping information, and any other information related to other entities that interact with the PRAE System may be stored and maintained by the PRAE System indefinitely unless removed manually. In other embodiments, such data is automatically deleted based on certain criteria, such as after a preset amount of time/days after full completion of the applicable return/exchange.

The PRAE system may also communicate (optionally) with a computer or mobile device 112 of a Logistics Partner's driver. Similarly, it may also communicate (optionally) with a computer or mobile device 110 of another driver, who is not affiliated with the Logistics Partner and does not have access to the Logistics Partner's computerized system or app.

Figure 2:
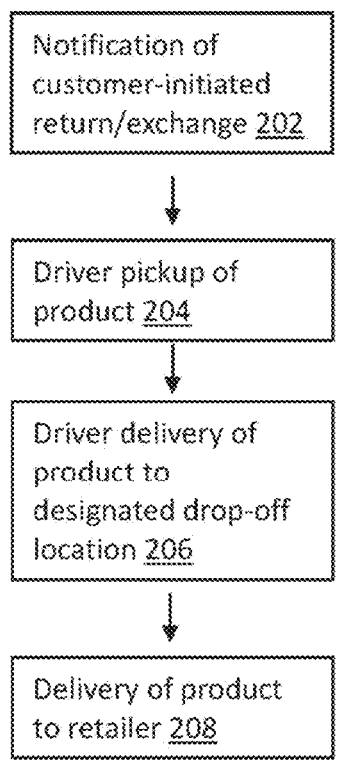
FIG. 2 is a general flow chart of the steps carried out (or received) by the driver and the driver system in accordance with the present invention.

FIG. 2 illustrates a general process flow chart of the steps carried out (or received) by the driver and the driver system in certain embodiments of the invention. Referring to FIG. 2, when a customer initiates a return or exchange 202 through the retailer's system 104, the PRAE System 102 receives a suitable notification from the retailer 104 (step 202). At this time, relevant information relating to the return/exchange to be carried out is transmitted to the PRAE System. Generally, the retailer system provides the address of the pickup location of the product, the identity of the product, among other information. The pickup address may be the customer's home address or another location.

In certain embodiments, the retailer system provide the identity of the customer, a pickup date/time window preferably selected by the customer, and customer-requested pickup instructions, such as a gate access code, apartment access information, additional pickup location information, etc. Further, details about the product are provided in certain embodiments, including the product's dimensions and weight, along with an identity of the product type or general product description.

In addition, data pertaining to the product from the retailer is provided to the PRAE System, including a retailer return number or identifier, a retail purchase number, etc. Some or all such information provided to the PRAE System is stored within the PRAE System database in a record newly generated for the return.

In certain embodiments, prior to the commencement of a return, customers and/or retailers can register with the PRAE System and provide various information during registration. For instance, a customer can register with the PRAE System and provide his/her name, address, telephone, and other identity/contact information, along with preferences such as preferred day(s)/time(s) of pickup of items to be returned (e.g., weekend only, 9:00 am-11:00 am, etc.) and other information that may be useful for future returns of products from that customer.

Retailers also can register (e.g., in advance of any designated pickup of a product to be returned) with the PRAE System and provide all relevant identity and address information, along with other data that is necessary or may be useful to enable the PRAE System to carry out the return/exchange process of the present invention. Retailers also can register with the PRAE System at the initial request to conduct a pickup of a product to be returned or exchanged.

In further embodiments, the PRAE System communicates with databases associated with the retailer to access/obtain some or all information mentioned herein pertaining to the retailer along with the identity of certain products, including each product's SKU or other identifier. For instance, upon request to return a particular product, the product's SKU may be provided which, in turn, enables the PRAE System to automatically obtain all other relevant information about the product from databases (whether databases of the retailer or third-party databases containing such information), including its identity, weight, size, color, etc.

In various embodiments, information concerning the product to be returned by a customer is obtained by the PRAE System in various manners. As described herein, relevant information is provided by the retailer to the PRAE System 102 at the moment in time (or shortly thereafter) a customer initiates a return request. Preferably, such information is automatically provided by the retailer's systems in automatic response to a customer request to return a product that has been purchased or otherwise obtained from that retailer (or retail partner). However, such information, in certain embodiments, may be manually provided. In an alternative embodiment, the customer provides some or all information concerning the product to be returned.

Retailers that may employ the present invention include retailers that have brick-and-mortar stores, strictly online retailers, or retailers that have both brick-and-mortar stores and an online presence/ability to sell goods/products via their own websites, via Amazon, and/or via one or more other types of online stores. Moreover, the product to be returned may be one that was previously purchased from a brick-and-mortar store, purchased online, and/or purchased or otherwise obtained via other means. Hence, the present invention, in its various embodiments, is broadly applicable to the return/exchange of products that have been purchased or otherwise obtain in various manners.

As briefly mentioned above, in certain embodiments, the customer may communicate with the PRAE System, and during such communication provide data relevant about the product to be returned along with data concerning the identity and location of the customer. Some of this information may already have been provided to the PRAE, such as in the case the customer is already registered with the PRAE System. In certain embodiments, certain customer information is automatically obtained by the PRAE System. For instance, the PRAE System may employ public records (e.g., public databases) to obtain the address of the customer.

Selection of Pool of Drivers

Upon notification of a customer-initiated return/exchange (step 202), along with the receipt by the PRAE System of all data relevant thereto as discussed herein, the PRAE System then automatically proceeds to analyze the supplied data, and data concerning activity of other returns/exchanges, as applicable, to ascertain the information about the pickup of the product to be returned. In particular, driver selection is carried out at this point in time.

In certain embodiments, the PRAE System of the invention presents information concerning the pickup to occur, including its location and date(s)/time(s) of the pickup and other relevant data, to a pool of available drivers who potentially are able to make the pickup. Using certain algorithms based on predetermined factors, the PRAE System automatically generates the pool of available drivers. Here, different methodologies may be employed using different factors. For instance, the distance (e.g., in miles or fractions of miles) of a driver at certain dates/times from the location of the product to be picked up will be employed. In many instances, the location of the driver at such certain dates/times is predicted based on the driver's already scheduled routes.

In certain embodiments, another factor employed to ascertain the pool of available drivers is whether a driver is already authorized to conduct pickups on behalf of the operator of the present invention or authorized by a logistics partner. The PRAE System communicates with systems of logistic partner systems (108 in FIG. 1) in order to identify potential drivers of the logistic partner(s) to be included in the pool.

Additional other criteria that may be employed to ascertain a driver or a pool of drivers includes, in certain embodiments, the size and weight of the product to be picked up. In such embodiments, products that exceed a certain size and/or weight may entail the use of a select set of drivers, or a select set of logistics partners. For instance, in the case a customer desires to return a relatively large and/or heavy product, drivers incapable or not licensed or otherwise not authorized to pick up such types of products are removed from the pool of available drivers.

Other factors, in various embodiments, include the type and size of the driver's vehicle, the current number of packages in a driver's vehicle, or the predicted number of packages in a driver's vehicle for a future scheduled pickup. Other limiting criteria may include whether the product to be returned is flammable or otherwise dangerous. Yet other types of criteria and information about the product to be returned may be included in the selection of a particular driver or a pool of drivers who can achieve the pickup.

Methodologies to identify an appropriate pool of available drivers for the pickup can include those methodologies employed by Uber Technologies Inc. or Lyft Inc., or other transport service that are used to identify a driver to pickup a pedestrian who desires to go to a preset location.

In certain other embodiments, the PRAE System broadcasts the data pertaining to the pickup to be carried out to multiple logistic transport services for auction, whereby the different logistic transport services identify a bid, or cost, to carry out the pickup and transport the product to the designated drop-off point. Via the auction, the PRAE System can take advantage of the available competing transport services within the geographic area of where the product to be picked up is located. It is noted that an individual driver with his/her own individual transport vehicle may constitute a logistic transport service and being retained and/or otherwise utilized to carry out the inventive processes of the present invention.

In yet other embodiments, logistics partners can identify potential drivers based on different criteria with respect to each other. That is, one logistics partner can use a set of criteria that differs from the criteria employed by yet a different logistics partner.

Upon identification of a pool of available drivers as described herein, one available in certain embodiments is selected and that driver then proceeds to accept or decline the selection as further described below. In other embodiments, multiple drivers from the identified pool of available drivers are contacted. Then, in one such embodiment, the first contacted driver who accepts is authorized to proceed with the pickup. In another embodiment, the driver who accepts who is closest to the point of pickup or designated to arrive earliest or closest to the designated time of pickup is authorized to proceed with the pickup. Other criteria to select the driver from a group of drivers who have accepted the pickup may be employed. Similar to the auction embodiment mentioned above, the driver in one embodiment who designates the greatest discount (or reduction in fee) is selected.

Authorized PRAE Driver Pickup

Figure 3:
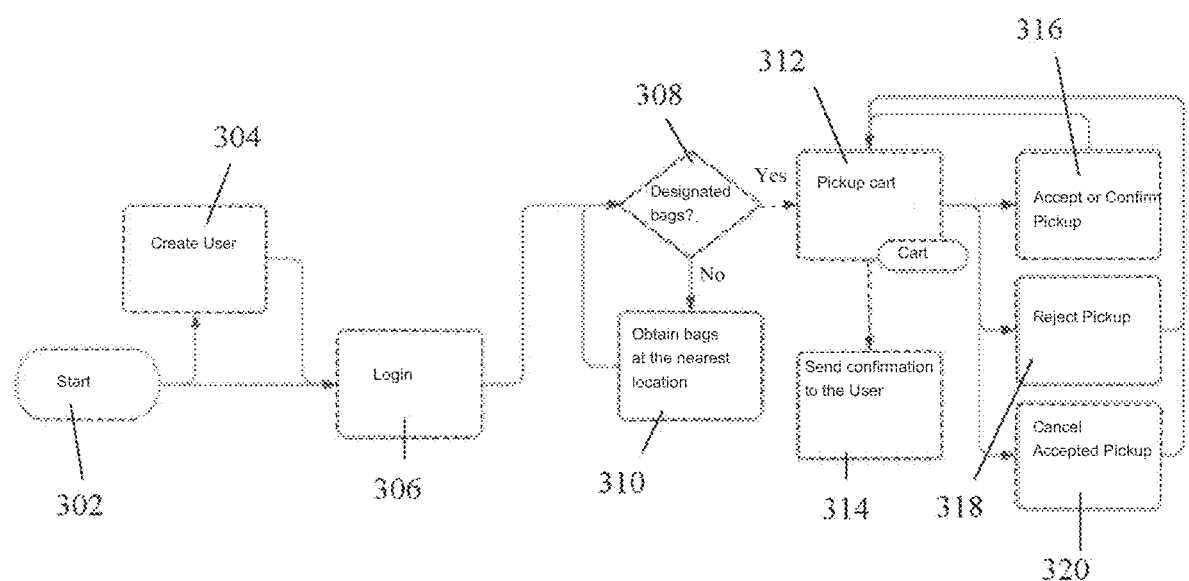
FIG. 3 is a flow chart of the authorized PRAE System driver assignment process employed in accordance with the present invention.

FIG. 3 illustrates a process flow chart of the authorized PRAE System driver assignment process employed in accordance with certain embodiments of the invention. That is, the driver assignment process includes the driver(s) who is contacted to accept or decline the product pickup assignment.

Initially, a driver creates an account with the PRAE System (step 304). Once created, the driver logs into his/her account to access the system (step 306). In accordance with the invention, the driver indicates whether or not they in possession of designated return containers of the present invention (step 308). As described herein, the return containers are containers into which a product to be returned is placed at the time of pickup of the product from the customer by the driver. As mentioned above, reference to designated bag or bag refers to the return container. Such container may be a box, envelope, bag, or other thing into which the product to be returned is placed by the driver.

In accordance with the present invention, each return container includes a tracking identifier that uniquely identifies the container. The tracking identifier may be a label adhered to the container, indicia printed or otherwise embedded on or in the container, a device contained within the container or internal within a portion of the container, or otherwise disposed in or on the container.

A non-printed identifier may include electronic devices, such as an RFID tag adhered to or contained within the container. Each RFID tag includes a unique identifier. In certain embodiments, the RFID tag is fully embedded within the container and thus not visible at all (from the outside of the container or looking in the container). Instead of an RFID tag, other forms of passive or active communication devices may be employed on or within the container with a unique ID that uniquely identifies the container.

The printed indicia in certain embodiments is a QR code (Quick Response code) that includes a unique identifier. In other embodiments, the printed indicia is a barcode that likewise includes a unique identifier. Other forms of identifier that uniquely identify each container may be employed in further embodiments.

For purposes herein, whether in the various embodiments the container includes a QR code, barcode, or other printed indicia, or electronic device such as an RFID tag, each container includes a unique identifier called herein a unique ID that unique identifies each container. References to QR code herein are intended to include embodiments/versions of the invention that may employ other indicia or technology (e.g., barcode, RFID tag, etc.) that enables for the unique identification of the container. For convenience, descriptions herein that indicate that the container includes a unique ID are intended to encompass the various embodiments that can employ any of the manners mentioned herein to uniquely identify each container.

If the driver indicates that he/she does not have the return containers, he or she will be directed to the nearest designated drop-off location to obtain the designated bags (310). Once the driver confirms he or she has the designated bags, the driver is prompted to either accept one or more pickups (316), reject pickups (318), or cancel an accepted pickup at any time (320). The accepted pickup will also be canceled after a predetermined amount of time has passed without the driver completing the pickup. If the driver accepts a pickup (316), the PRAE System sends a confirmation notification to the customer (314). The confirmation notification, in one embodiment, does not include information about the driver. In another embodiment, select information about the driver is provided to the customer.

If the driver rejects the pickup (318), or if an accepted pickup is canceled by the driver, or the time limit has expired (320), the pickup is placed back into the queue for selection by another driver. In one embodiment, if the accepted pickup is cancelled, then the PRAE System sends a cancellation notification to the customer. The customer must then, at a later time, commence another request to return the product.

In another embodiment, the PRAE system may initiate a two-step verification process, sending a specific code to the customer at the time of pickup (or near the time of pickup), and requiring the person who provides the return or exchange item to the driver to enter the same code. Other known types of known security features may be used to confirm that the person who provides the item for pickup is authorized to do so by the customer.

In other embodiments, the PRAE system will generate and maintain a unique identifier for the product or the pickup transaction and update the data in the PRAE database when the product changes chain-of-custody (i.e, is picked up by the driver from the customer and then transported and left at the drop-off location). The unique Digital Fingerprint of the pickup transaction and/or product being returned may also be reflected in an NFT, which is generated for the product. The NFT may be implemented on a blockchain, and may also store chain-of-custody information about the person who has the custody of the product during various step of the return transaction.

Logistics Partner Driver Pickup

Figure 4:
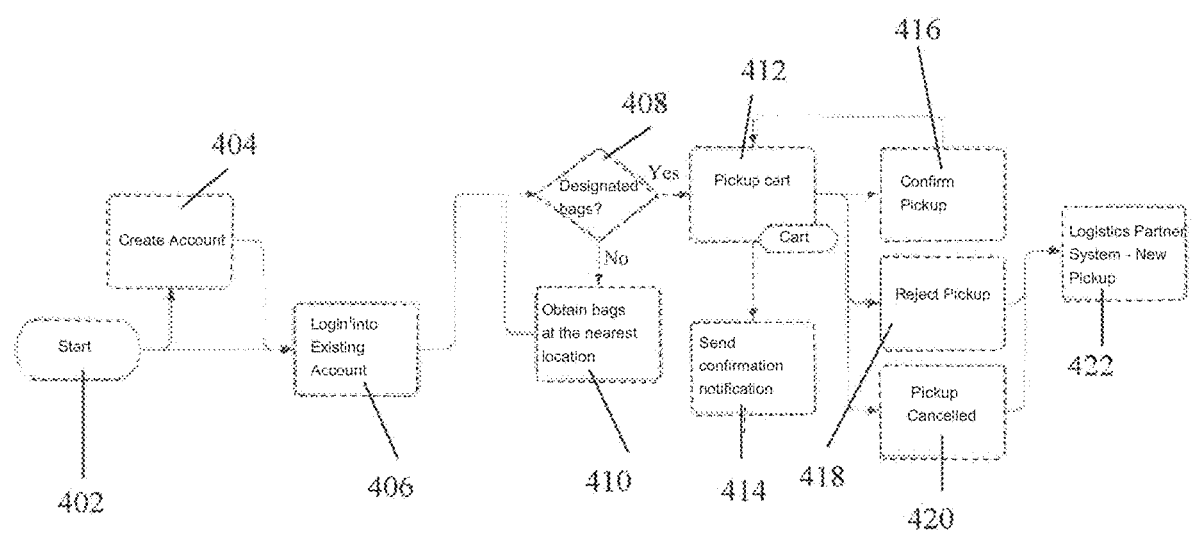
FIG. 4 is a flow chart that illustrates the logistics partner driver assignment process in accordance with the present invention.

FIG. 4 is a flow chart that illustrates the logistics partner driver assignment process in accordance with certain embodiments of the present invention.

Similar to the process of FIG. 3 for an authorized PRAE System driver, a driver of a logistics partner initiates the process (step 402) and creates an account (step 404). Once created, the driver logs into his/her account (step 406). In another embodiment, the driver's login credentials are communicated by the logistics partner system 108, thus obviating the need for the driver to enter and/or remember the login credentials. Such credentials may be the same as those to enable the driver to access the logistics partner system.

The logistics partner driver is then prompted to confirm that he or she has in his or her possession one or more of the designated PRAE System containers (step 408). If not, the driver is directed to a location where he/she can obtain the return containers (410). The driver is prompted to either confirm the assigned pickup(s) (416), reject the assigned pickup(s) (418), or cancel an assigned pickup at any time (420). The assigned pickup will also be canceled after a predetermined amount of time has passed without the driver completing the pickup.

If the driver confirms a pickup (416), the PRAE System sends a confirmation notification to the customer (414). The confirmation notification does not include any identification information about the driver. But, in another embodiment, select information about the driver is provided.

If the driver rejects the pickup (418) or if an accepted pickup is canceled by the driver or the expiration of the predetermined time limit (420), the pickup is placed back into the system for acceptance by another driver and the driver will be directed back to the logistics partner system 108 to be assigned a new pickup (422).

Moreover, the PRAE System will cancel the pickup altogether and notify the customer of the cancellation if the accepted pickup is canceled by the driver or there is an expiration of time limit.

Driver Pickup Process

Figure 5:
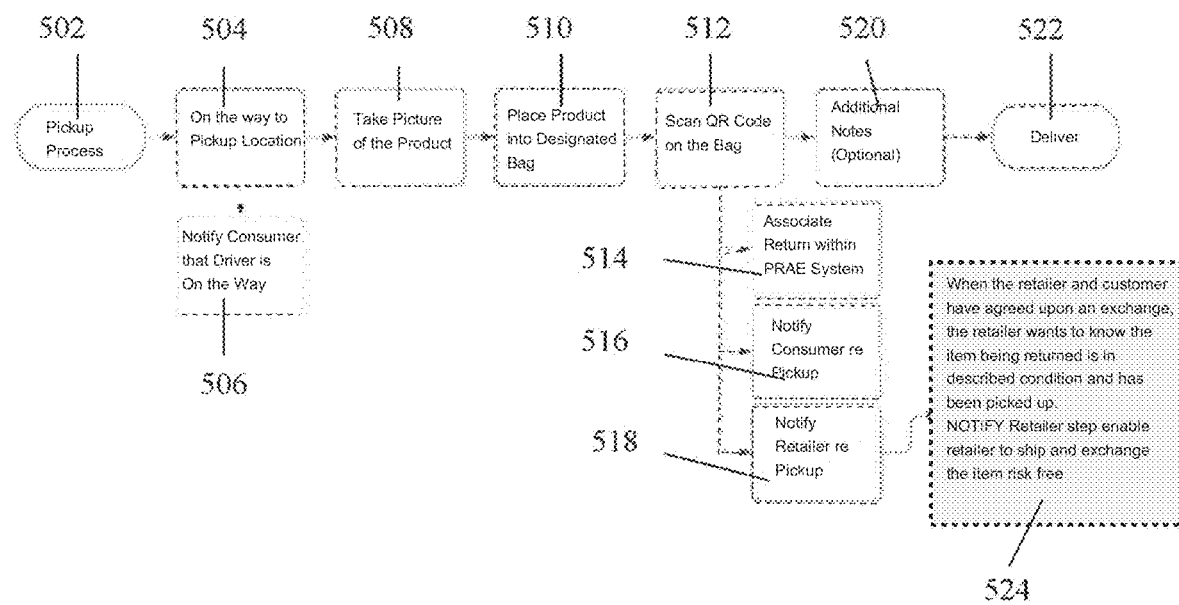
FIG. 5 is a flow chart of the driver pickup process in accordance with the present invention.

FIG. 5 is a flow chart of the driver pickup process in accordance with certain embodiments of the invention. The driver may be an authorized PRAE System driver or an authorized logistics partner driver.

The PRAE System provides the driver with certain information to facilitate the pickup process, including the pickup address, directions to the pickup address, a description of the product to be picked up, the product's size and weight, and other information relevant to the pickup. This may include special instructions, such as gate access instructions, apartment access instructions, etc. Such information is automatically provided by the PRAE System upon acceptance by the driver as discussed above.

At the start of the pickup process (step 502), the driver is prompted to indicate when he or she is on his or her way to the pickup location (step 504). In a variation/another embodiment, such indication is automatically carried out via the driver's system using appropriate GPS tracking data. Such GPS tracking data, in certain embodiments, is automatically provided to the PRAE System and it is the PRAE System that determines when the driver's vehicle has begun the route to the product pickup location.

When the driver has begun the route to the pickup location, the PRAE System automatically sends a notification to the customer that a driver in on its way (506). In certain embodiments, the notification is provided only when the driver is within a preset amount of time and/or distance to the pickup location. In yet other embodiments, the customer is provided with a notification at periodic intervals.

The customer is further notified of the estimated pickup time (506) and, in certain embodiments, information about the driver, such as the driver's vehicle type.

When the driver reaches the designated pickup location, the driver obtains the product to be returned (Step 204 in FIG. 2). The customer may provide the product to the driver directly or the product may be included in a receptable of some sort or located immediately outside the customer's home, or at location designated by the customer.

The driver obtains the package. In accordance with the invention, the driver takes a photograph of the product (FIG. 5: step 508). In other embodiments, multiple photographs are taken. Photograph data is called herein the "second return product data." The driver then proceeds to place the product within a designated container (Step 510).

The driver, in further embodiments, inspects the product before placing it within the container. The inspection may be in lieu of taking one or more photographs (in one embodiment) or in addition to taking photographs (in another embodiment). The inspection, in accordance with the invention, entails the driver assigning a rating between 1 and 5 as a function of the condition of the product. An excellent product without any damage is rated 1, and a product with noticeably substantial damage is rate 5, with intermediary levels of 2 to 4 being assigned as appropriate. In other embodiments, other forms of inspection and indication of quality of the product may be employed.

In other embodiments, the inspection may be a simple verification that the actual product matches the product description provided to the driver via his electronic device. That is, the driver simply confirms that he/she has picked up the correct type of product.

In further embodiments, the inspection entails the driver assessment of various characteristics including one or more of the following: visible damage to the product's structure, unusual odors, type of damage such as scratches on a screen or a wooden surface, ascertaining a broken part (e.g., a broken leg of a table), or other form of damage.

In yet other embodiments, the driver, via his/her electronic device, answers a set of questions that are displayed to the driver during the inspection process. The questions posed are stored in a database and are a function of the type of product being picked up. For instance, for a piece of furniture, various questions may be directed to different parts of the product, such as to the legs or table surface. For electronics, questions posed may be about the screen, keyboard, etc. Hence, the driver in certain embodiments, is carefully instructed to inspect specific parts of the product thus providing a relatively high level of inspection as to the quality of the product being returned. Accordingly, in accordance with the present invention, a database of questions for hundreds (or thousands) of different types of products may be employed to enable pickup drivers to properly inspect goods.

In one or more embodiment, the system may employ artificial intelligence (AI) methodologies/processes, including AI iterative processes and/or visual image recognition software to perform additional automated product verification and/or authentication at the point of pickup. For example, the software or AI may examine an image of the item at the time of pickup and confirm some unique identification features on the product being picked up. For instance, it may examine some hologram, identification code or an associated NFT (non-fungible token) associated with the picked up item as part of the authentication or verification processing, to confirm the authenticity of the returned product.

The system and/or AI may also instruct the driver to perform some additional product verification or product authentication steps based on the AI and image recognition processing on the picked-up product. For example, the AI may require the driver to take additional images of some hidden tags, or holograms on a luxury item, or confirm the ownership record via NFT-tracking software, where the NFT identifies the actual product and stores the ownership or identification id of the product, or stores the chain of title that can be automatically tracked to the customer.

In the case of electronics or other forms of electrical products, in further embodiments, the inspection may entail the driver turning the product on and then conducting a set of tasks as instructed to him/her via the driver's electronic device. For a simple device, such as a lamp, the driver may be instructed to simply plug the lamp into an electrical receptacle (preferably a receptacle in the driver's vehicle) and turn the lamp on to verify that the lamp is operational. For more complicated devices, the driver is instructed to turn on the device and performs steps that are directed to the specific product being picked up. However, it is appreciated that some forms of electrical products, such as a smart phone, may not be returnable in this manner, but such restrictions can be determined by the operator of the PRAE System/process of the present invention.

In yet further embodiments of the invention, the driver is instructed to take a video of the product wherein the driver turns the product around during the video so that different surfaces/sides of the product are taken. In a variation, photographs of different surfaces/sides of the product are taken.

In each of the embodiments described herein, all information regarding the inspection, including the driver's answers to questions, the driver's rating, photographs and/or a video(s), and other information about the product that is provided at the time of product pickup, is transmitted from the driver's electronic device to the PRAE System and associated with the record pertaining to the particular product being picked up for return. The transmission may occur immediately during the driver inspection of the product or at a later time, such as when the product is delivered by the driver.

After the driver places the product just inspected within the designated container (step 510), the driver scans the unique ID that is on (or in) the designated container (step 512). In accordance with the present invention, the driver's electronic device is suitably programmed/designed to ascertain the unique ID of the container.

In the embodiments where the unique ID is a QR code or a barcode, or other indicia printed (or otherwise provided) on the container, use of the camera on the driver's electronic device to photograph the printed indicia allows for the identification of the container's unique ID. In one embodiment, the image taken by the driver's electronic device is "deciphered" by the PRAE System, which analyzes the photograph to ascertain the unique ID. In another embodiment, the driver's electronic device includes software to identify the unique ID of the QR code or barcode (or other indicia) on the container. Currently, most smart phones have software that can identify the unique ID represented by either a QR code or barcode. However, other forms of printed indicia may be employed, such as coding systems developed in the future.

In the embodiments in which the container contains a RFID tag (or other electronic device) that includes a unique ID code, the driver's electronic device may be retrofitted with a suitable RFID reader to obtain the unique ID code of the RFID tag. In a variation, a separate RFID reader is employed that communicates the read unique code to the driver's electronic device. For other forms of electronic devices (whether active or passive) that are employed on or within the container, suitable readers that have been developed to read or communicate with those electronic devices are employed.

In the various embodiments described herein, once the unique ID of the container (now containing the product to be returned) has been obtained, that data is associated (step 514) with the record relating to the particular product just picked up by the driver. Upon identification of the unique ID of the container that now includes the product to be returned, the PRAE System automatically transmits a notification to both the customer and the retailer that the product has been picked up (steps 516, 518).

In a further embodiment, the unique ID code on the container includes, embedded within it, data that identifies the product, the location of the pickup, and any other information relevant to the return of the product. Alternatively, the container into which the product is returned does not contain a unique ID.

Moreover, the driver may provide yet further information (step 520) about the pickup, the customer and/or the product within his/her electronic device, with such information being included in the record associated (step 514) with the product to be returned. For example, if the driver encountered a difficult customer, that information may be included for future reference. Hence, historical information about experiences with particular customers who return products (e.g., multiple times) may be tracked via the present invention. The driver then proceeds to deliver (step 522) the product at the drop-off location.

Driver Pickup and Drop-Off Process

Figure 13:
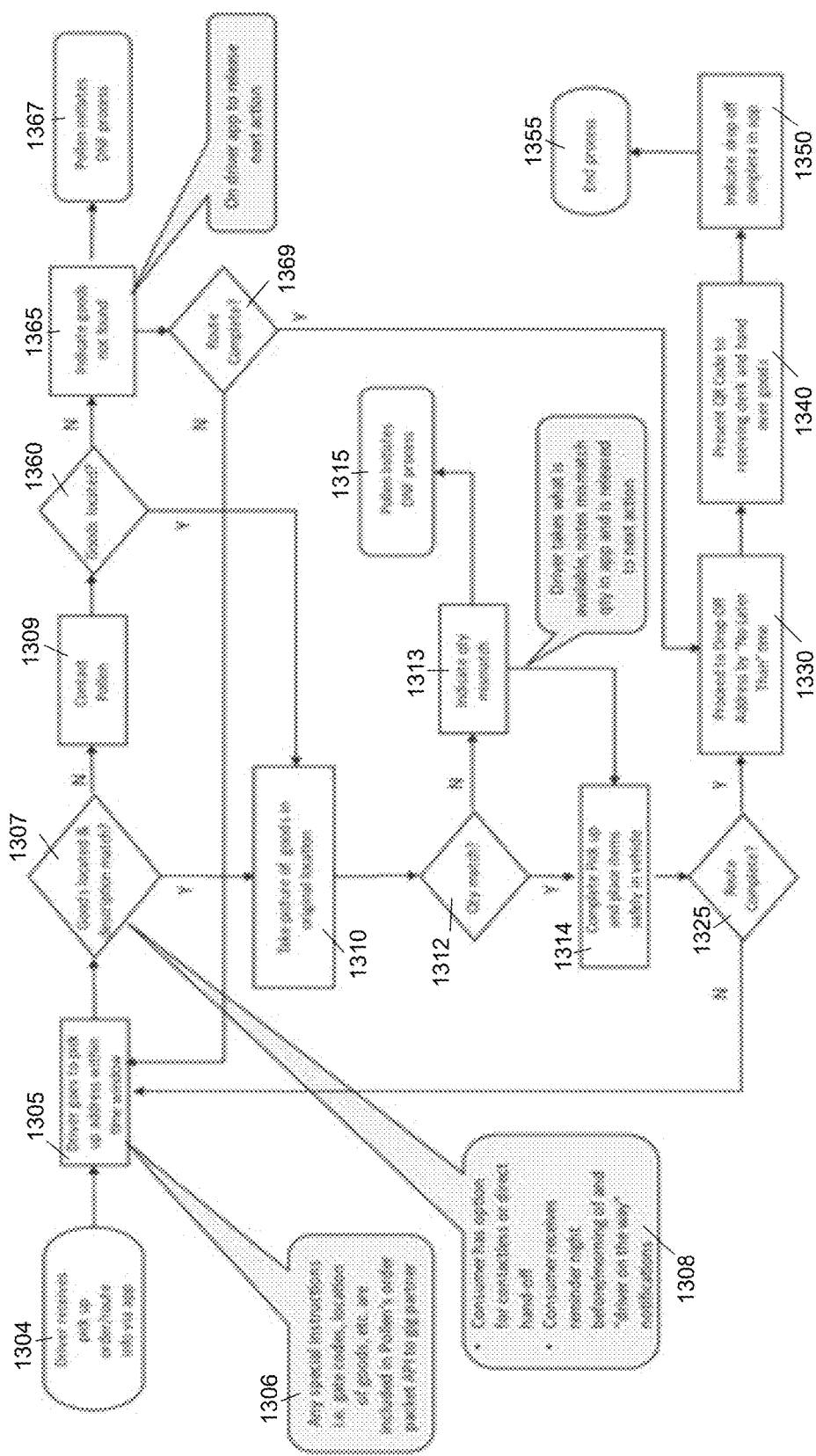
FIG. 13 is a flow chart of another variation of a driver pickup and drop-off process in accordance with the present invention.

FIG. 13 is a flow chart of another variation of a driver pickup and drop-off process in accordance with certain embodiments of the invention. The driver receives (1304) a notice via logistic partner app to pickup a product for drop-off from a particular location. The driver then proceeds (1305) to the indicated location for the pickup. In some embodiments, the driver may receive (1306) additional instructions, via app, to perform certain product review steps and/or authentication or verification of the product. In some additional embodiments, the driver may further be instructed by the software or AI on the PRAE system to perform some additional product authentication checks or verification.

In other embodiments, the PRAE system will generate and maintain a unique identifier for the product or the pickup transaction and update the data in the PRAE database when the product changes chain-of-custody (i.e, is picked up by the driver from the customer and then transported and left at the drop-off location). The unique Digital Fingerprint of the pickup transaction and/or the product being returned may also be reflected or updated in an NFT, which may be generated for the item. The NFT may be implemented on a blockchain. The NFT can be used to store, together with other product data, the chain-of-custody information about the person who has the custody of the product during the pickup and drop-off transaction. The product NFT may also contain the authenticity verification data for the product (i.e., confirm that the customer purchased an original and authentic item from the merchant partner). The ability of the system to maintain a clear chain-of-custody record avoids or reduces any chance of a mistake, fraud or potential misuse, particularly when returning or exchanging higher priced luxury goods.

If the examination of the product by the driver determines that the item matches the one for which there was a return or exchange request placed through the PRAE system (1307), the driver may take a digital image or a video (1310) of the product at the pickup location. The image or images (of the video) may further be evaluated by the software or AI using image recognition, which may also perform product authentication and verification processing.

In addition, prior to the pickup, the consumer may be given an option (1308) of doing a direct, hands-off or contact-less delivery, and receive a prior reminder from the PRAE system at prior time (for example, a night before), and another reminder when the driver is on the way to the pickup location. The communications with the consumer may also include additional offers of an upgrade, exchange, rebate or some other additional product offer or option from a merchant partner.

If it is determined that the quantity of the picked-up product matches (1312), the driver may complete the pickup and place (1314) the product into a special bin or the vehicle. If the quantity of the picked up product does not match (1312) the description in the pickup order, then the driver may indicate (1313) a quantity mismatch on the logistics app, or communicate the error directly to the PRAE system. The PRAE system will initiate the "product was not found" processing (1315) communicate this to the consumer and the authorized merchant partner.

When the product description and quantity both match, the system determines (1320) whether the driver's route is complete (i.e., whether there are no additional pickups on the route). If not, then driver is instructed to proceed to the next pickup location. Otherwise, when the route is complete, the driver is instructed to proceed (1330) to the drop-off location, where the QR code on the delivered bag is scanned (1340) by the receiving desk and the delivered goods are accepted and unloaded from the car. At that point, the system indicates that the "drop-off was successful" (1350), and the PRAE automated system sends (1355) a notification about the successful drop-off to the consumer and the merchant partner.

If the product to be picked up was not found, did not match the inspection or did not match the description provided to the driver (1307), the drive may communicate directly with the PRAE system representative or help desk (1309) to try to find the product or conduct additional inspection steps. If the goods are successfully located (1360), the driver may proceed to taking a picture or a video of the product (1310) using a digital camera of mobile phone device. Otherwise, the system determines that there was an error and the product was not found at the indicated location, or did not match the description (1365). The PRAE automated system then initiates and transmits (1367) the "product not found" error/notice to the consumer and the merchant partner. The system also determines (1369) whether the driver has other items on the route and, if so, directs him or her to the next pickup address. If there are no other pickups, the driver is directed (1330) to the drop-off location, to deliver all the product that he picked up on the route.

Assessment of Driver Inspection—Refund/Credit

In accordance with the present invention, the driver inspection in certain embodiments provides sufficient feedback to the PRAE System and to the retailer of the product just picked up to provide sufficient assurance to the retailer that a credit or refund can be immediately processed. In such embodiments, if the data regarding the outcome of the inspection of the product meets set criteria for the product under consideration, then the retailer deems the product returned (now in the custody of the driver retained for the pickup by the PRAE System) and provides the customer with a refund. The refund generally is a refund to the credit card originally charged by the customer when the product was initially purchased. Since the process for providing a refund to a customer who returns a product is well known, the details of providing such monetary refund is not described herein. The retailer instead may provide the customer with a store credit at this time.

In accordance with the invention, different criteria for providing a refund (or credit) may be set for different types of products. Accordingly, the PRAE System of the invention includes, in certain embodiments, a database of criteria for each type of product. The criteria may vary (and will likely vary) as a function of the cost of the products. That is, lower priced products may have lower criteria (as compared to higher priced goods) to enable for the immediate issuance of a refund at the time the driver picks up the product. Certain types of products also are more amenable to visual inspection and thus the rating provided by the driver may be employed to determine if the refund is to be provided at product pickup.

In certain embodiments, manual inspection of the photographs and/or video of the product taken by the driver is employed to ascertain whether the refund should be provided. The manual inspection may be achieved by the retailer itself or another entity retained by the retailer to conduct such effort. Hence, multiple retailers may join together and utilize a professional inspection company that visually inspects photographs/videos of products to determine whether a refund should be provided. It is important to note that such inspection(s), by the driver at the time of pickup, and/or by personnel who visually view photographs/video of the product, is/are occurring well before the product is actually received by the retailer.

In other embodiments, inspection of the photograph(s) and/or video of the product picked up by the driver is automatically assessed by software suitably designed to analyze the imaged product and to assess its quality based on such images. The PRAE System may employ a third-party processing company for this assessment. Such automated analysis, in certain embodiments, may take into account the particular product being returned and information available about that product in databases, such as in a database of the original manufacturer and/or retailer of that product. Accordingly, comparison analysis methodologies may be employed to assess whether the just-returned product is visually identical to a new product based on data and images about that product pre-stored in a database. For non-electronic products, such visual comparison, automatically achieved using data from the manufacturer or retailer of that product, will give sellers of that product a high level of assurance that the returned product is resellable, and thus result in, in certain embodiments, the processing of a refund to the customer immediately upon the driver taking possession of the returned product.

As indicated above, the inspection by the driver (and possibly the inspection/analysis of photographs/video of the product) enable retailers to determine whether or not they want to initiate refunds (or credit) to customers for returned products based on the results of such inspection/analysis. Each retailer can set its own criteria for the immediate refund of various products or establish an agreed-upon set of criteria. Of course, if the inspection results in a sufficiently low rating of some sort, then retailers will not be inclined to immediately provide a refund at this point in time.

Exchanges

In cases where a customer has requested an exchange for a product to be returned, the retailer may initiate the exchange process (step 524) immediately upon pickup of the product to be returned by the driver. A retailer may employ the same criteria to provide a refund for a product just picked up by a driver (as discussed above) to immediately commence an exchange. Or, the retailer may employ different criteria.

To commence an exchange, the retailer authorizes the mailing of the exchanged product, as previously selected by the customer, to the customer's designated location. In some instances, the customer will receive the replacement product within perhaps one or two days from the point in time when the driver picked up the originally bought product from the customer. In contrast to this, in current systems, a customer must mail the product back to the retailer, which can take several days or more, the retailer then may take several days (or more) to inspect the returned product, and then several more days may pass before the customer receives the exchanged product. This process may take several weeks or longer. With the present invention, the turnaround may be as little as a day or two.

The retailer may opt to not immediately process an exchange at the time the returned product is picked up by the driver, at which point, the returned product must undergo further processing and inspection before an exchange will occur.

Driver Drop-Off

Figure 6:
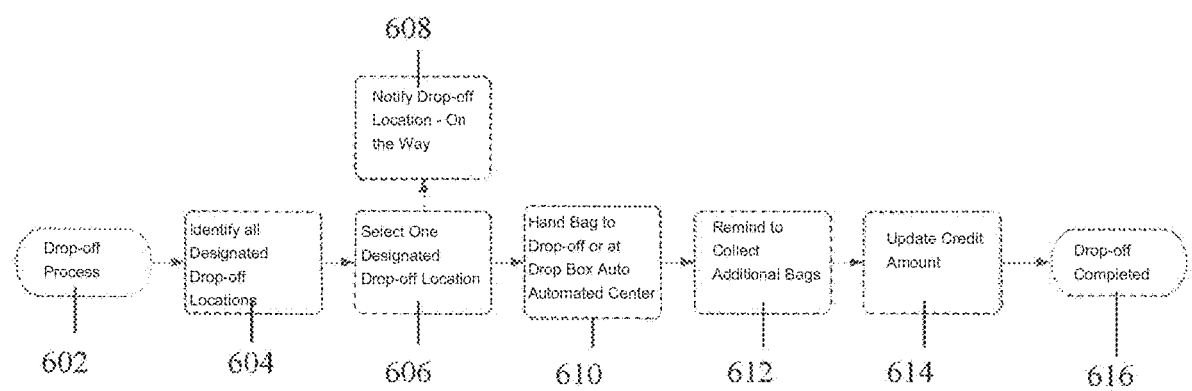
FIG. 6 is a flow chart of the driver drop-off process in accordance with the present invention.

FIG. 6 is a flow chart of the driver drop-off process in accordance with the invention. Upon the driver has picked up the product to be returned, the PRAE System identifies potential drop-off locations (Step 604). The driver select one of the identified designated drop-off locations (step 606), which triggers the transmission of a notification from the PRAE System to the selected drop-off location that a delivery is on its way (Step 608). In another embodiment or optionally, the PRAE System selects the nearest drop-off location or another designated drop-off location, and thus the driver isn't able to select the location. The driver then proceeds to drive to the selected drop-off location (FIG. 2: Step 206), and then provides the container(s) with returned products therein to an attendant at that drop-off location (Step 610). If there is no attendant, the driver may be directed to place the container(s) in a drop-chute of a box or other preferably secure bin/location.

Rather than drop-off the picked-up product immediately, the driver may instead be directed to pick up additional products in accordance with the invention and/or perform other transport functions before dropping off the containers.

Once received at the drop-off location, the indicia on each container is scanned to identify the unique ID. Suitable scanning equipment with software capable of ascertaining the unique ID from the scanned image is employed. If the unique ID is contained within an RFID tag (or other electronic device), then a suitable RFID scanner is employed to ascertain the unique ID associated with a container. This scanned piece of data is sometimes referred to herein as the "third return product data."

In certain embodiments, each container is opened and the product therein is assessed and verified to be the product identified in the record associated with the container's unique ID. Further, the product may, in certain embodiments, be inspected at this point to verify that the data in the record is accurate. Hence, a second inspection is conducted at this stage in the process of the present invention.

The second inspection confirms the accuracy of the first inspection carried out by the driver. If the first and second inspection results are the same or consistent, the PRAE System may keep track of this result and attribute it to the particular driver who had picked up and inspected the product. Hence, data regarding the inspection accuracy of drivers may be tracked in accordance with the invention. If, however, the second inspection results vary significantly with the first inspection conducted by the driver, that information may likewise be tracked. If a driver has too many negative marks against him/her, then the PRAE System ultimately will remove that driver from the pool of authorized drivers to inspect products.

The driver at this time is reminded to collect additional products (612) or to carry out other activities as appropriate.

Similar to the various embodiments in connection with the first inspection that may be carried out by the driver at product pick-up, the second inspection that is carried out may entail arrange of activities. The second inspection may be of a higher level of scrutiny of the product in certain embodiments. The facility at which the second inspection is carried out may have technology not available to the driver and, thus, the second inspection can be more intense and more precise. Such inspection may be of higher satisfaction to retailers resulting in a retailer commencing with a refund/credit (Step 614) to a customer upon the successful second inspection of the returned product. Similarly, a retailer may commence the above-discussed exchange as a result of a successful second inspection.

The second inspection may entail any of the activities carried out during the first inspection by the driver and/or entail yet other types of processing/imaging/analyzing of the returned product. In certain embodiments, the second inspection may entail little to no assessment of the returned product.

Upon successful drop-off by the driver of the container(s) (with a product inside each container) at the designated drop-off location, the PRAE System transmits a suitable notification to the logistics partner system or other system that indicates that the driver has completed product pickup and drop-off.

Finally, the PRAE System arranges for the delivery of each returned product from the drop-off locations to the retailer of that product (FIG. 2: Step 208). The location of the delivery to the retailer preferably is identified by the retailer at the beginning of the process, that is, at the initial point in time when the retailer provides data regarding the customer and product to be returned. In accordance with the invention, the location of ultimate drop-off of the returned product to the retailer is, in certain embodiments, one of the attributes taken into account for identification of the drop-off location by the driver.

However, depending on the various locations of retailer drop-off, such attribute may or may not have impact on where the driver is to drop-off the product. Retailers may be located in other cities or states (or countries) and coordination of where products are ultimately to be returned will take all of this into account. The PRAE System of the invention employs shipping services (e.g., the U.S. Postal Service, FedEx, UPS, etc. or logistic partners) if necessary to arrange for final return of the returned products.

Upon the ultimate return of a product to a retailer, as confirmed by the shipping service (or logistics partner), the PRAE System notifies the retailer's system of such return. In most embodiments, the customer also is notified. At this point, the returned product is back in the hands of the retailers. If the retailer has not yet provided the customer with a refund (or credit) or exchange, if requested by the customer, then the retailer should arrange for such refund or exchange.

Order Management Automation Through PRAE System

The operation and process flow of the overall PRAE System in accordance with certain embodiment is described with reference to FIGS. 7-11.

Figure 7:
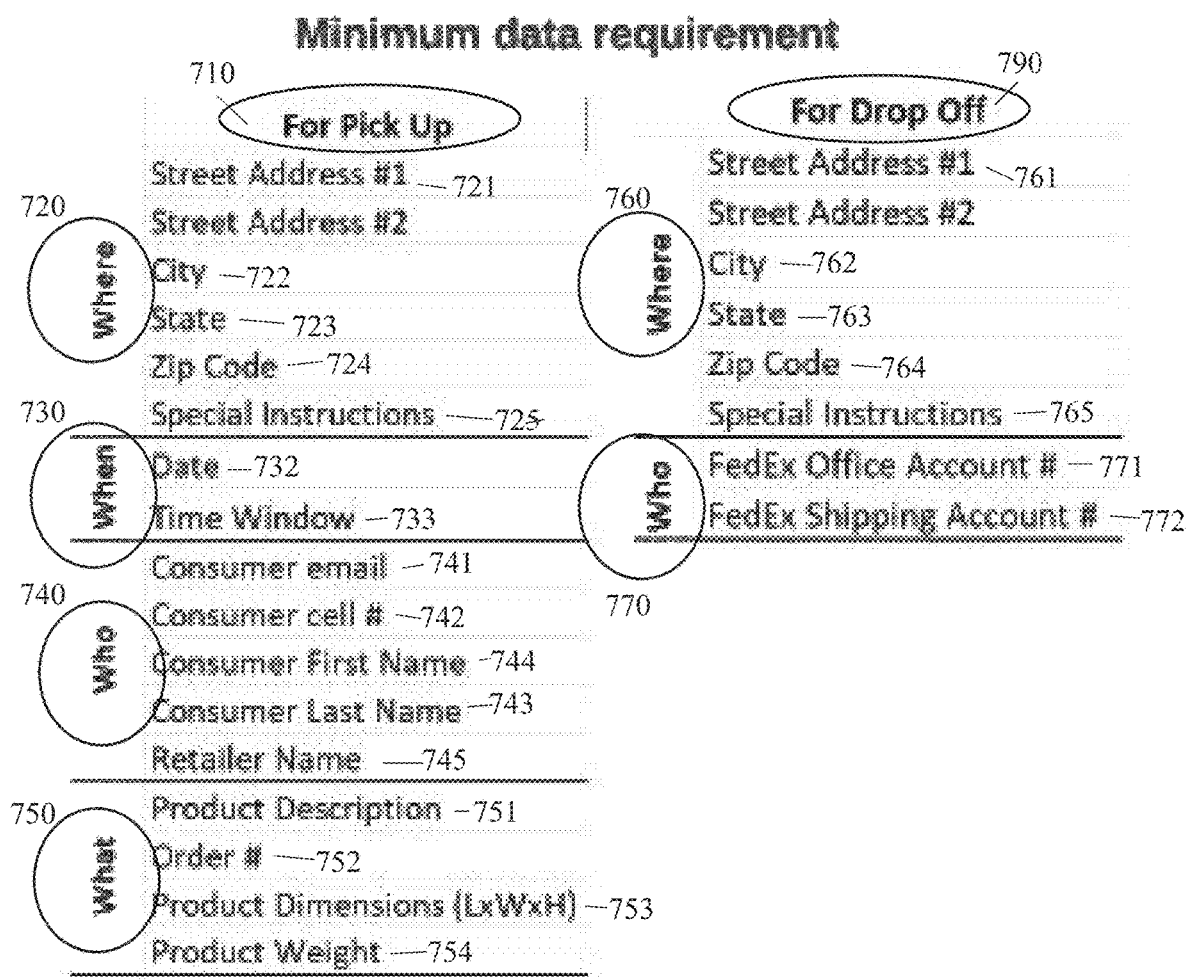
FIG. 7 illustrates an example of the minimum data requirement for the pickup and drop-off process initiation and processing through the PRAE System in accordance with certain embodiments.
Figure 8:
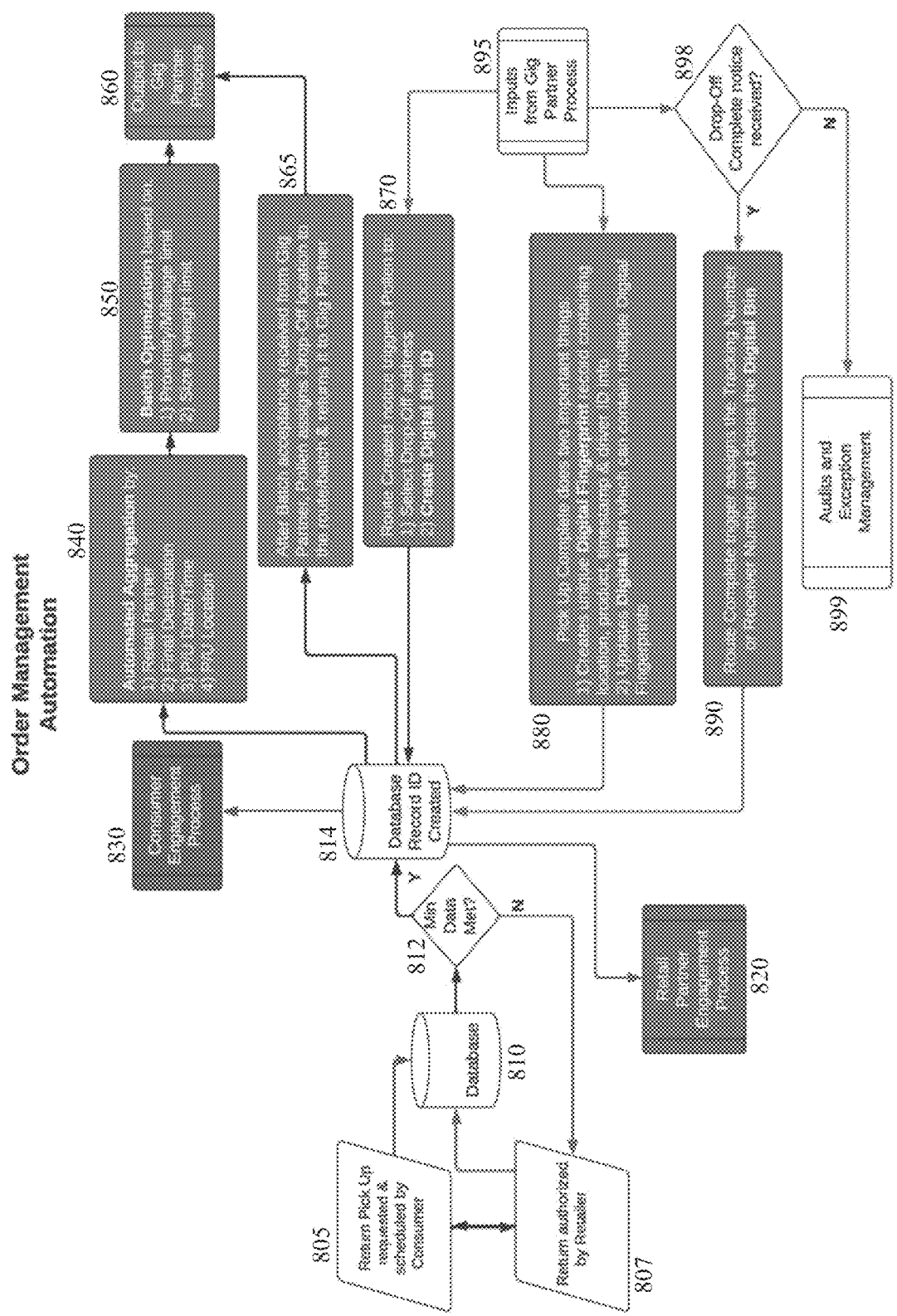
FIG. 8 is a flow chart of the PRAE System/Process and illustrates various communications and process flow between the customer, the order management computerized system, the retail partner and the logistics partner.

Before discussing FIG. 7, FIG. 8 is a flow chart of the PRAE System/process, and illustrates various communications and process flow between the customer, the order management computerized system, the retail partner and the logistics partner (or "Gig partner"). As shown in FIG. 8, a product return requested and scheduled by a customer at step 805. The customer may also electronically communicate (step 807) with a retailer in order to initiate and authorize the return of the purchased product.

As part of the authorization process and scheduling of the return though the PRAE System, the customer and/or the retailer who authorizes the return communicates the scheduling request and the related product information to the order management computerized system and database 810, where the request is stored and further processed by one or more computer processors (e.g., CPU) operating and executing computer instructions (stored in computer memory) on the order management computerized system. At step 812, the order management computerized system evaluates the received request and determines whether the required minimum data is provided for the product in order to properly process it for pickup and delivery through the PRAE System.

Minimum Data Requirements for PRAE Processing

FIG. 7 illustrates an example of the minimum data requirement for the pickup and drop-off process initiation and processing through the PRAE System in accordance with certain embodiments.

The pickup data 710 may be organized into several required data items related to: (1) where (720) the product is to be picked up; (2) when (730) the product is to be picked up; (3) who (740) is the customer (or returning party) and who is the retailer; and (4) what (750) is the product that is being returned.

The where (720) data may include certain required data fields such as the street address 721, city 722, state 723, zip code 724 and special instructions 725. The when (730) data may include the required fields for the pickup date 732 and a specific time window 733 for the pickup. The who (740) data may include the required fields for the customer identification and contact, such as the customer's first and last names 743, 744, customer's email 741 and customer's phone number 742. It may also include a name of the retailer 745. The what (750) data may include the required fields that describe and identify the product to be picked up. This may include the required fields for the product description 751, order number 752, product dimensions 753 and product weight 754. The presence and evaluation of the minimum data requirements for the product are processed by the order management computerized system to determine whether the product can be properly processed for pickup and delivery through the PRAE System.

Similarly, the drop-off data 790 may be organized into data items related to: (1) where (760) the product is to be dropped off; and (2) who (770) is permitted to receive the product.

The where (760) data may include certain required data fields such as the street address 761, city 762, state 763, zip code 764 and special instructions 765. The who (770) data may include the required fields for the FedEx (as an example) Office Account Number 771 and the FedEx Shipping Account Number 772. The presence and evaluation of the minimum data requirements for the drop-off are also processed by the order management computerized system to determine whether the product can be properly processed for pickup and delivery through the PRAE System.

Referring again to FIG. 8, if it is determined at Step 812 that the minimum data requirements for the processing though the PRAE System have been met in the received request for a pickup, a database record id is created (step 814) for the product and stored in the database of the order management computerized system with the provided pickup and drop-off data for the product. If the order management computerized system determines (as part of the computer program executed by one or more processors) that the minimum requirement for the pickup or drop-off of the product through the PRAE System have not been met, the pickup request is communicated back (Step 807) to the authorized retailer, who then can communicate with the customer and request to restart the scheduling process with additional/missing data provided by the retailer and/or the customer.

When the order management computerized system creates (at Step 814) a database record id for the request and stores the provided id and data in the database, it then initiates a retail partner engagement process (Process 820) and customer engagement process (Process 830). In addition, the order management computerized system also builds an Automated Aggregation (Process 840), where return orders are aggregated by such data fields as: (1) retail partner; (2) final destination; (3) P/U date/time; and (4) P/U location.

The aggregated orders may then be processed and optimized (Process 850) by the order management computerized system based on: (a) a proximity/mileage limit for pickup or delivery; and (b) size and weight limit of the pickup product(s). The aggregated and optimized information is then transmitted to the Gig partner engagement process (Process 860), where the Gig partner, who determines whether it will accept the pickup and delivery of the batch of orders that has been aggregated and optimized for the Gig partner by the order management computerized system.

The Gig partner processes each batch of aggregated and optimized orders, and, if it accepts the batch order, it builds a route for pickup and delivery and sends it as input (Step 895) back to the order management computerized system. The order management computerized system creates a digital bin id (process 870), assigns the drop off and returns route at Process/Step 870, and then returns the data to the Gig partner for processing the pickup and delivery of the products in the batch/route.

After the pickup is completed, the Gig partner also sends a "pickup complete" notice to the order management computerized system, which then, at step 880, (1) creates a Digital Fingerprint record containing location, product information, time-stamp and driver id information; and (2) updates Digital Bin which may contain multiple Digital Fingerprints for different products that are picked up for delivery on the route.

After completing the drop-off, the Gig partner communicates the "drop-off complete" notice to the order management computerized system. When the order management system receives the "drop-off complete" notice from the Gig partner at step 898, it indicates that a particular route is completed by the Gig partner. The order management system then assigns a tracking number or receiver number and closes (Process 890) the digital bin that has been delivered. If no "drop-off complete" notice is received by the order management computerized system, it initiates an Audit and Exception Management (Process 899) to process and track non-delivered products.

Gig Partner Process

Figure 9:
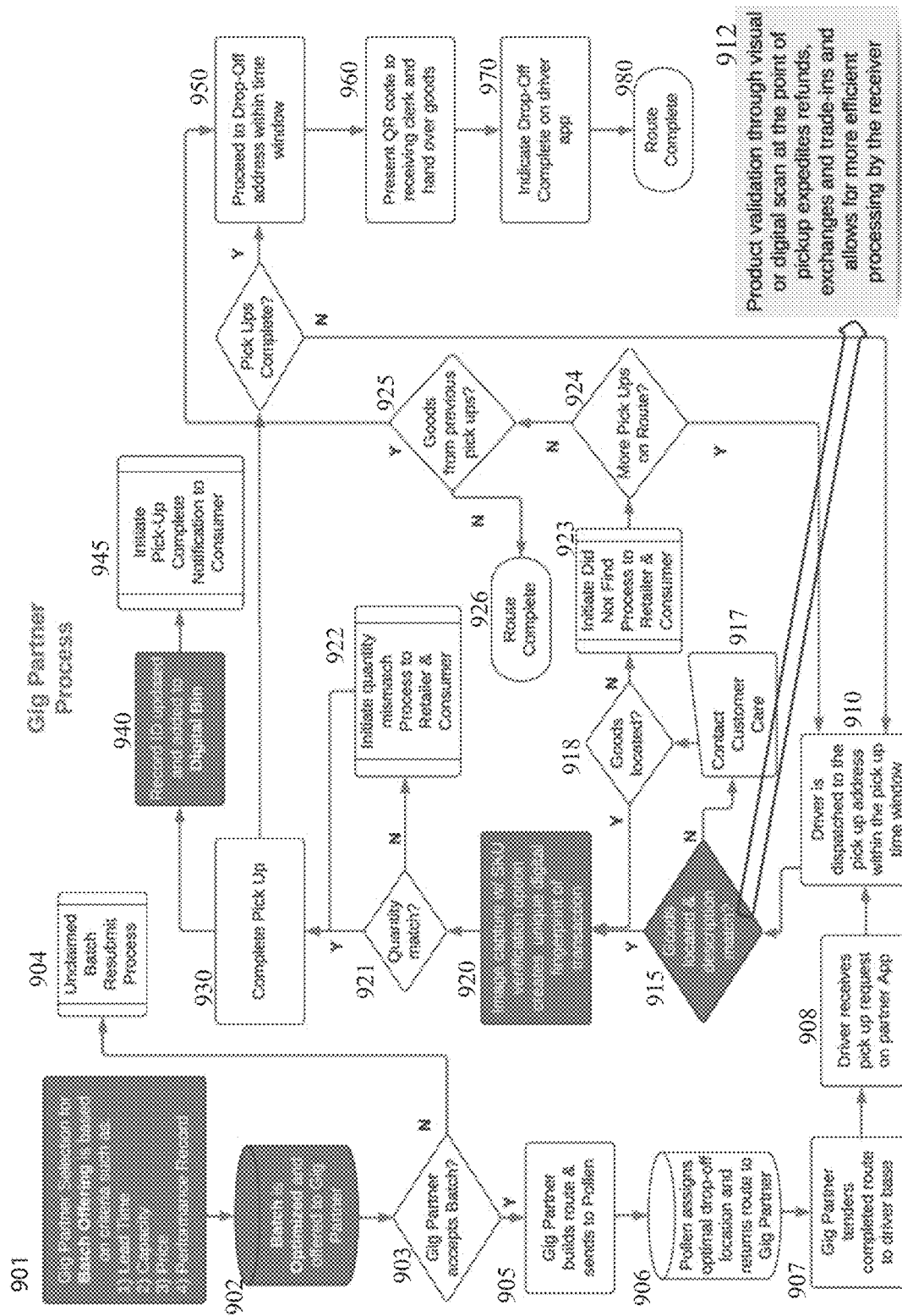
FIG. 9 illustrates the Gig partner engagement process flow and communications between the Gig partner and the order management computerized system in accordance with certain embodiments of the present invention.

FIG. 9 illustrates the Gig partner engagement process flow and communications between the Gig partner and the order management computerized system, in accordance with certain embodiments. As discussed above, the Gig partner receives a batch offering of the pickup and delivery orders that have been aggregated (at step 840 in FIG. 8) and optimized (at step 850 in FIG. 8) by the order management computerized system.

An automated process at the order management computerized system executes computer instructions that processes the Gig partner selection for the batch offering (Process 901) based on such factors as: (1) lead time; (2) capacity; (3) price; and (4) performance record of the Gig partner. The batch of order is also optimized (Process 902) when it is offered to the Gig partner by the order management computerized system. The computerized system of the Gig partner then determines (Step 903) whether to accept the offered optimized batch for pickup and delivery. If not accepted, the Gig partner returns the notice back to the order management computerized system (Step 904) for resubmit processing. If accepted, the Gig partner builds a route for the batch order (Step 905) and sends the route information to the order management computerized system for processing.

After the order management system assigns the optimal drop-off locations and returns the accepted route information back to the Gig partner at Step 906, the Gig partner offers (Step 907) the completed route to the drivers affiliated with the Gig partner through a partner app or through an online portal of the Gig partner, or some other computerized application, websites or access point. After a particular driver receives the pickup requests (Step 908), the driver is dispatched (Step 910) to the pickup address for the order, to pick up the indicated products in the time window specified in the order.

In certain embodiments, the driver is directed to perform product validation through a visual or digital scan at the point of pickup (912) to determine whether the products are actually present and if the description of the products (in the pickup order) matches (Step 915) the actual products. This type of verification at the point of pickup expedites refund processing, exchanges and trade-ins, and also allows for more efficient processing by the receiving entity of all returned products. The various different embodiments described herein with respect to image capture and other inspection activity may be applied.

If products in the pickup order are not located or the description does not match, the driver or the customer at the pickup location may automatically contact the customer care assistance (Step 917) of the order management system, where the driver may be assisted in finding the correct products for pickup. If the picked-up products are all located, either initially at step 915, or with the assistance of the customer care at steps 917 and 918, the driver may be instructed to perform an image capture with SKU verification option of the pickup products, at step 920.

This process creates a unique Digital Fingerprint of the transaction and allows better verification and tracking of the picked-up product. The Digital Fingerprint is processed and associated by the order management computerized system with the pickup order and the product that is being picked up. Once the image capture is completed and a unique Digital Fingerprint is created, the system checks whether the quantity of the picked-up products matches (Step 921) the order. If not, the error process (Process 922) is initiated through the order management computerized system to the customer and retailer, indicating that there was a quantity mismatch between the number of products in the pickup order and the actual number of products that were at the pickup location.

Similarly, if the pickup products could not be located at the pickup location, an error process (Process 923) is initiated through the order management computerized system to the customer and retailer, indicating that a particular product that was scheduled for pickup could not be found at the indicated location.

The system then automatically checks whether the driver has more products for pickup on the same route (Step 924). If so, the system then dispatches the driver to the next pickup location/address in the specified time window for the next pickup (Step 910) on the same route. If there are no other pickups on the same route, the system then checks (Step 925) whether the driver has any products from a previous pickup. If not, then the route is completed (Step 926), and the "route complete" notice may be sent to the order management computerized system. If the driver still has products from a prior pickup, the system instructs him/her to proceed to a drop-off address (Step 950) within the indicated time window for the corresponding order.

Similarly, if the driver was able to complete the pickup (Step 930), and the number and description of products matched the picked-up products, then the order management computerized system updates the record id for the picked-up product and adds it to the Digital bin (Step 940). Then, the order management automation system initiates a "pickup complete" notification to the customer (Step 945) to inform him or her that the pickup was successful. At the same time, the Gig partner app checks whether the pickup was complete and informs the driver to proceed (Step 950) to the drop-off address.

At the drop-off location, the driver may present the ID code to the receiving clerk and hand over the products that were delivered on the order. The system may then indicate (Step 970) on the driver app that the "drop off was completed", and indicate that the "route is complete" (Step 980) for the driver.

Customer Engagement Process

Figure 10:
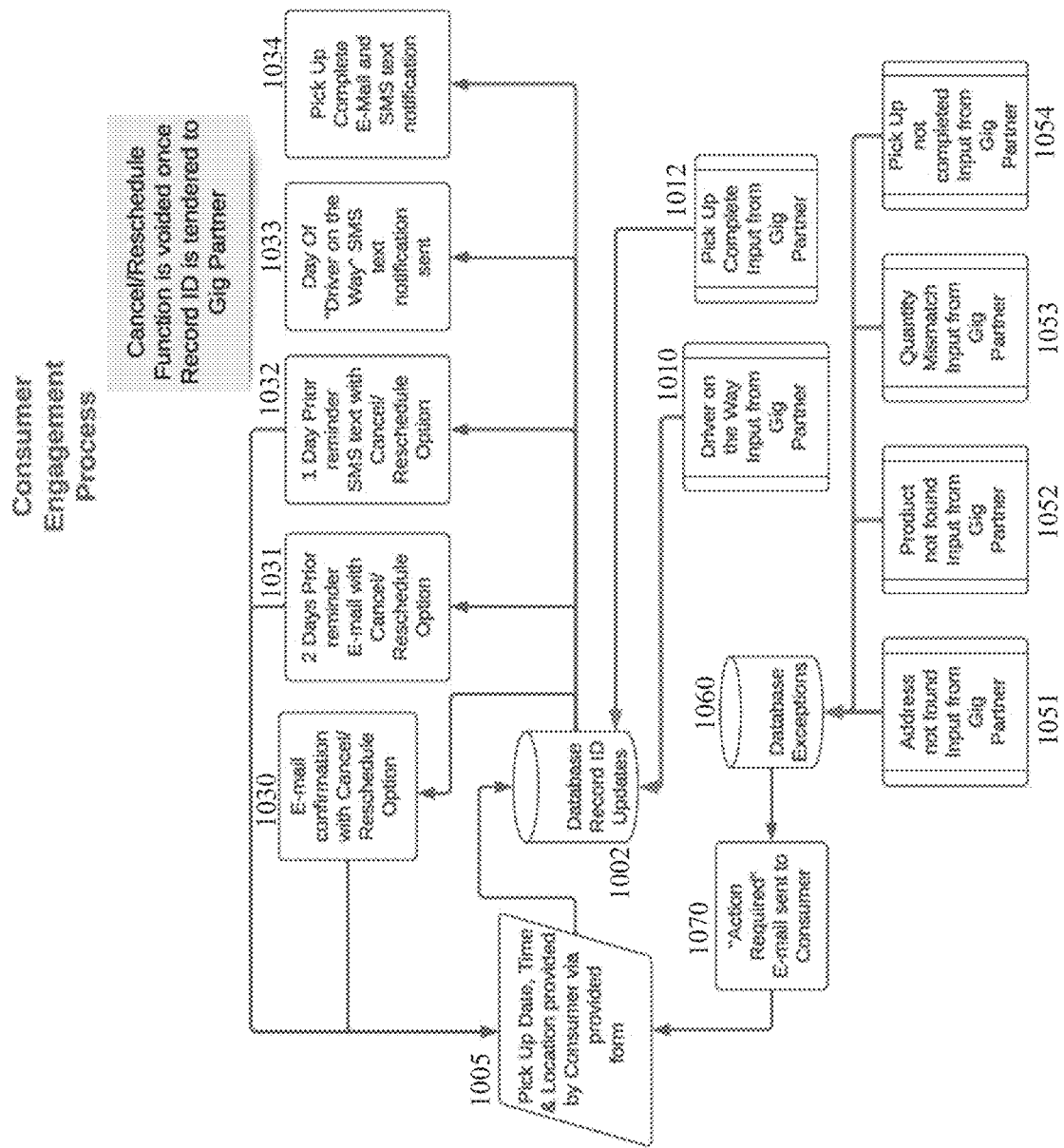
FIG. 10 shows the customer engagement process in accordance with certain embodiments of the present invention.

The customer engagement process flow and communications between the customer and the order management computerized system are described with reference to FIG. 10.

The customer communicates a pickup and delivery order (Process 1005) to the order management computerized system through a specific form, where the minimum information (discussed above with reference to FIG. 7) is entered. The order information triggers the record id update (Process 1002) and stores the order information in the database of the order management computerized system.

The order management computerized system receives different types of notifications from the Gig partner, and in some circumstances sends notices to the customer in response to the received notifications from the Gig partner. When the Gig partner sends a notice to the order management computerized system that the "driver is on the way" (Process 1010) to the pickup location, the order management system sends (Process 1033) a "Driver on the way" SMS text or an email to the customer. Similarly, when the Gig partner sends a "pickup complete" (Process 1012) notice, the order management system sends a "pickup complete" (Process 1034) SMS text and/or an email to the customer.

The order management computerized system may also send an email or SMS to the customer with a cancel/reschedule option (Process 1030). The cancel/reschedule option may also be sent as a 2-day prior reminder (Process 1031) and/or 1-day prior reminder (Process 1032). The cancel/reschedule function or option (available to the customer) is voided once the Record ID is tendered to the Gig Partner for pickup and delivery.

In some circumstances, there was some error or an exception in the process, and the product could not be picked-up or delivered as requested. For example, the Gig partner may send a notice that the "address for the pickup could not be found" (Process 1051), that the "product could not be found" at the pickup location (Process 1052), that "there was a quantity mismatch" (Process 1053) between the number of products indicated in the order and number of products at the pickup location, and that the "pickup was not completed" (Process 1054). In such cases, the order management system records (Process 1060) the exception or error in the database and generates (Process 1070) "action required" email to the customer. The generation of a specific email and/or the SMS to the user may be done by the order management computerized system automatically, based at least partially on the received notification from the Gig partner.

Retail Partner Engagement Process

Figure 11:
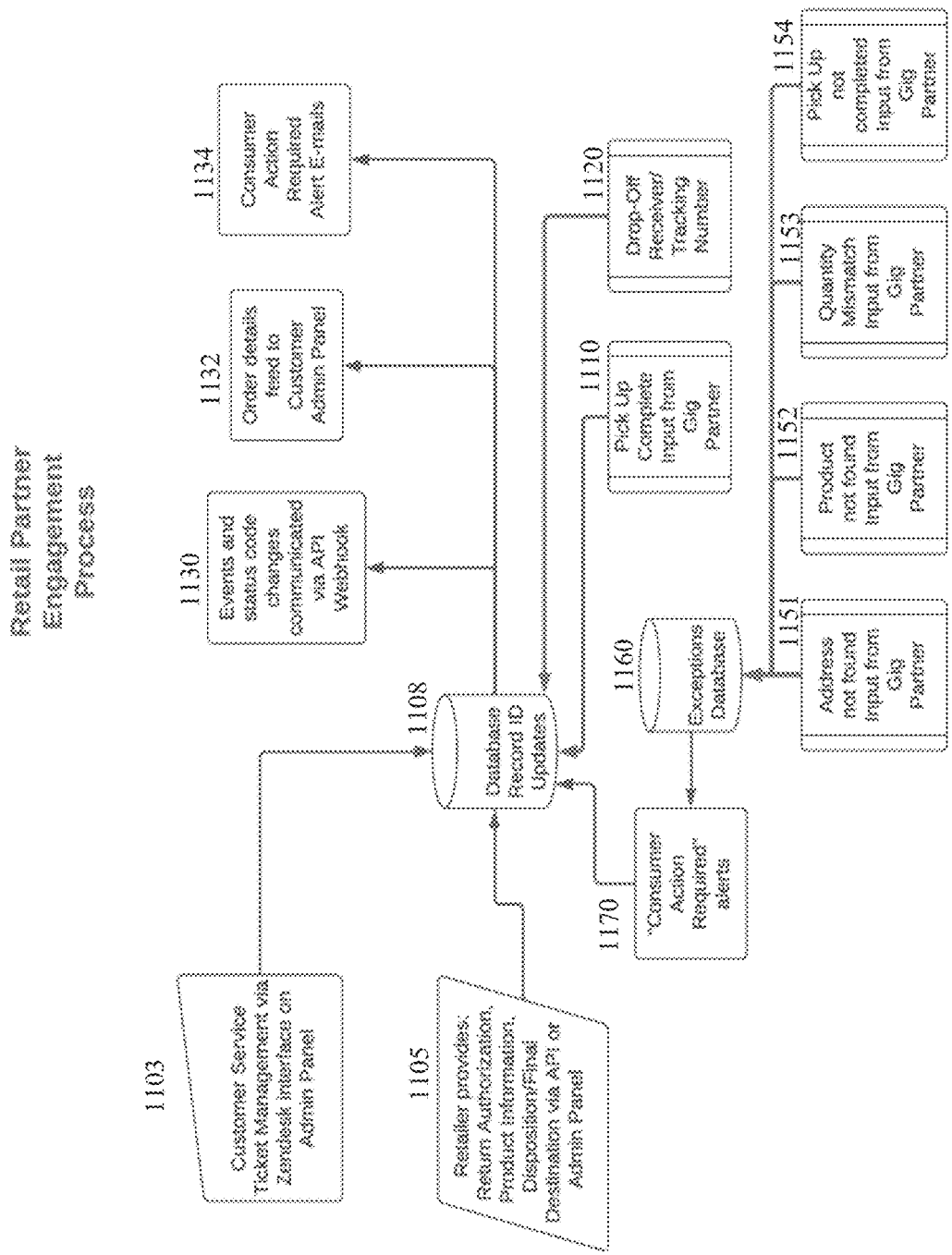
FIG. 11 shows the retail engagement process flow in accordance with certain embodiments of the present invention.

The retail engagement process flow and communications between the retail partner and the order management computerized system are described with reference to FIG. 11.

A retail partner communicates with the customer and provides the return authorization (Process 1105), product information, disposition/final destination to the order management computerized system via API or Admin panel. Optionally, there may be a customer service ticket management, using customer software instant messaging (Process 1103) via interface or Admin panel.

The order management computerized system receives different types of notifications from the Gig partner, and in some circumstances sends different notices to the retail partner in response to the received notifications from the Gig partner. The events and status code changes are communicated to the retail partner from the order management computerized system, and the database (Process 1108) via API Webhook (Process 1130).

The order details and updates feed to the customer Admin Panel (Process 1132), and the "customer action required" alerts may be sent via email or text (Process 1134). The types of exceptions or errors that require a trigger of the "customer action required" are error notifications from the Gig partner that the "address for the pickup could not be found" (Process 1151), that the "product could not be found" at the pickup location (Process 1152), that "there was a quantity mismatch" (Process 1153) between the number of products indicated in the order and number of products at the pickup location, and that the "pickup was not completed" (Process 1154). In such cases, the order management system records (Process 1160) the exception or error in the database and generates (Process 1170) "customer action required" email to the customer and/or the retailer partner. When the "pickup compete" notification (Process 1110) or the drop-off receiver/tracking number is received from the Gig partner, a notification is also sent to the retail partner.

Complete System and Process Flow

Figure 12A:
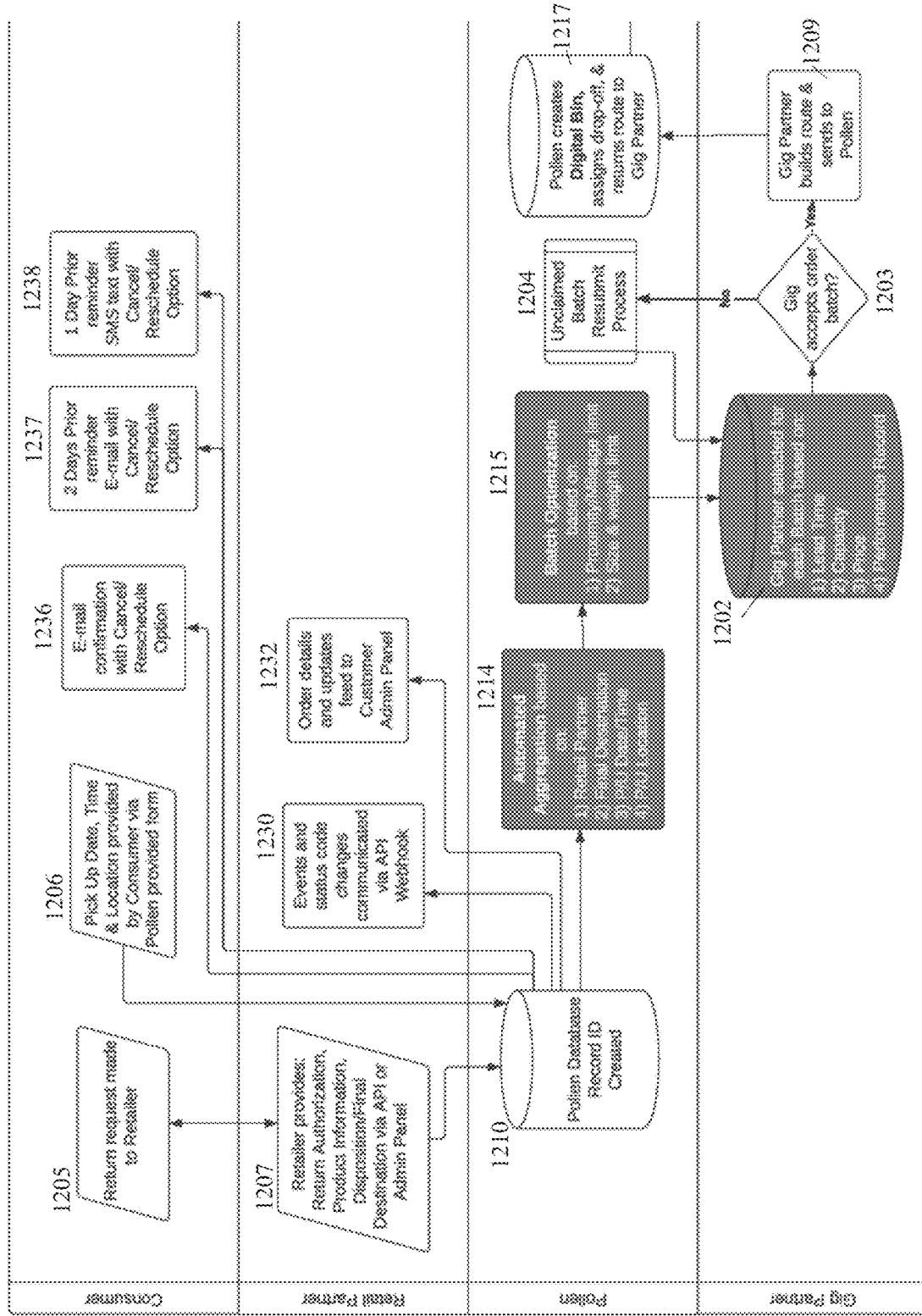
FIGS. 12A, 12B, and 12C collectively show a flow chart of the overall PRAE System and process of the present invention.
Figure 12B:
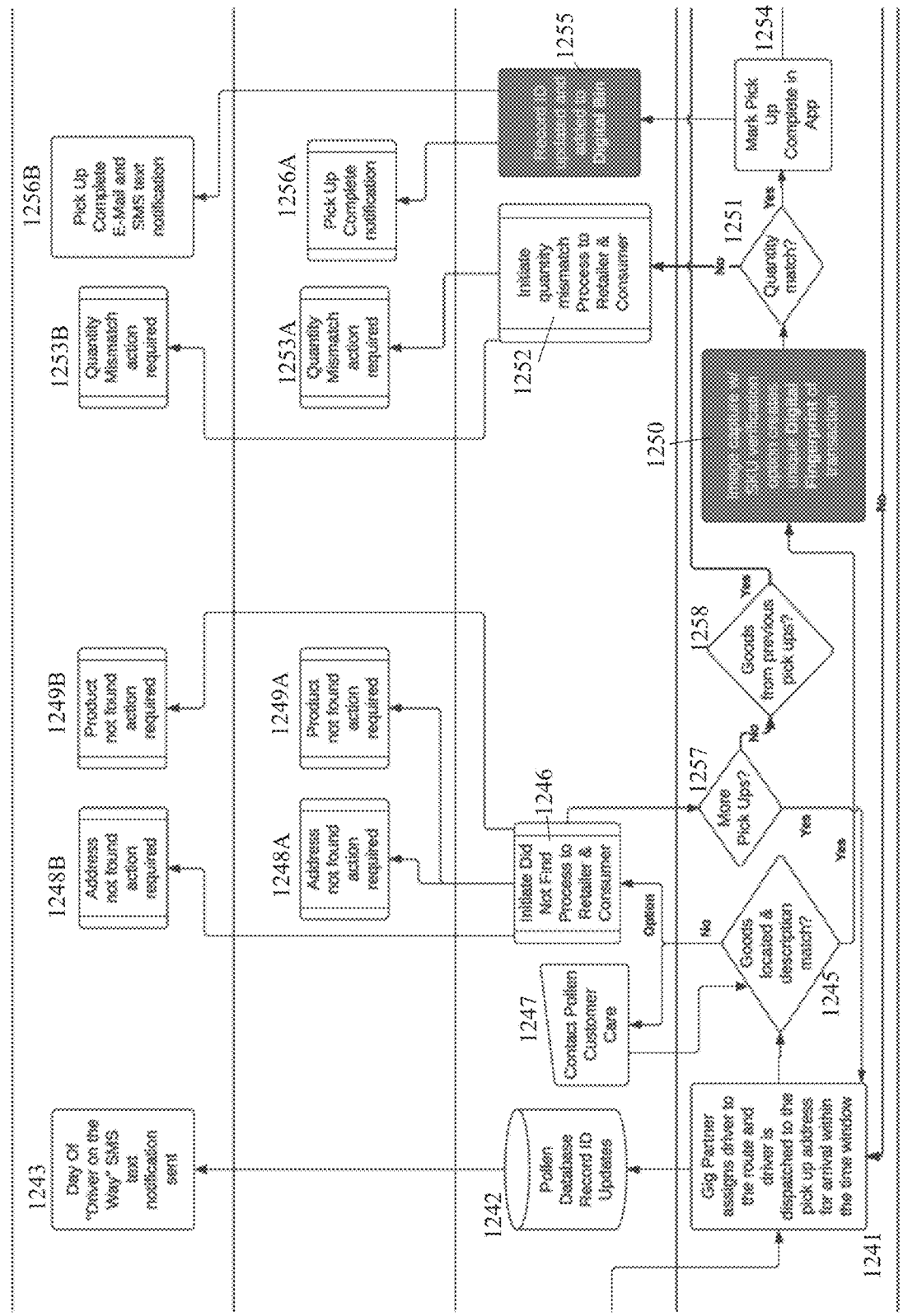
Figure 12C:
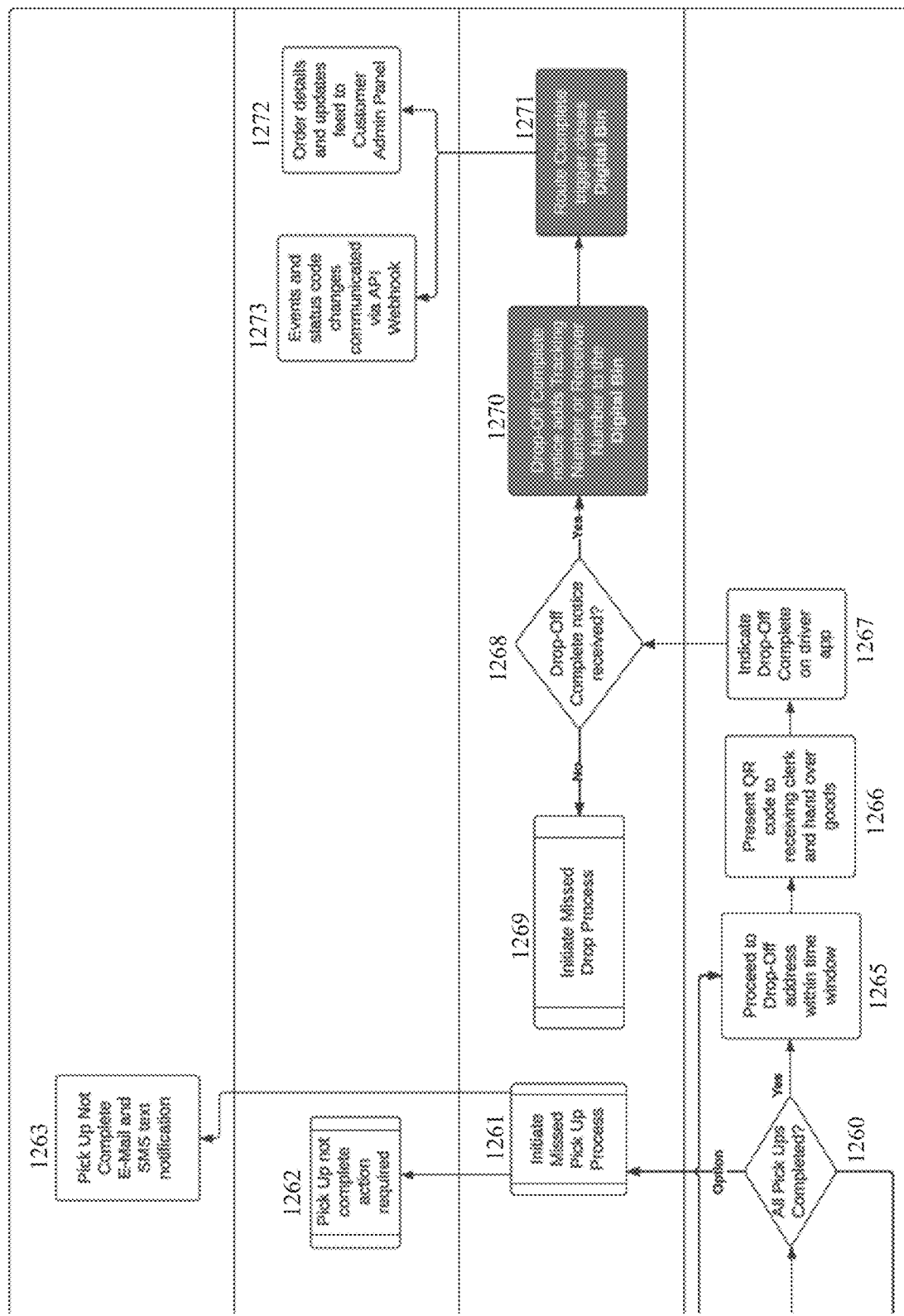

FIGS. 12A-C collectively show a flow chart of the overall PRAE System and process of the invention, and illustrate the overall process flow and communications between the customer, the retail partner, the order management computerized system, and the Gig partner in accordance with additional, further embodiments.

Referring to FIG. 12A, a return of a product is requested and scheduled by a customer at step 1205. The customer may also electronically communicate (Process 1207) with a retailer in order to initiate and authorize the return of the purchased product. The retailer who authorizes the return also communicates the scheduling request to the order management computerized system and a database (Process 1210) where the request is stored and further processed by one or more computer processors operating and executing computer instructions on the order management computerized system. The pickup date, time and location are provided by the customer to the order management computerized system through a specific form that requires entry for the minimum required fields.

In at least one embodiment, the system may use an AI/Machine Learning software to present the consumer with different optional dates for delivery. For example, the different optional dates may have different associated prices, based on the past evaluation and analysis of the busier dates, routes, surge times and other pricing factors for various Gig partners. The pricing may also reflect variations in supply and demand at different locations, times and distances to the drop-off locations, or cost of fuel differences at various locations and/or dates.

In at least one embodiment, the system may also use an AI/Machine Learning and/or computerized analytics to determine the best ways to add additional offers, discounts, rebates, upgrades and other types of promotions or other products as part of the communications with the consumer during the pickup and delivery process. For example, the PRAE system may use predictive analytics based on the past performance regression analysis that certain product-related offers are more likely to be accepted by the customer if introduced at the time or prior to scheduling a pickup and exchange. Thus, PRAE system may communicate this information to the retail partner and add an appropriate potential offer, discount, rebate, upgrade or other type of promotion from the retail partner before or during the time of scheduling the pickup of the product for exchange or return.

In one example, the PRAE system may use the software or AI/Machine Learning to determine that a particular upgrade would motivate the consumer to perform the exchange rather than return the purchased item for a refund. Thus, an offer of an upgraded exchange may be provided to the consumer who initiates the return of the product through the PRAE system. This would reduce the cost of shipping and processing refunds, and motivate the consumers to upgrade rather than return some purchased products.

In another example, the PRAE system may the software or AI/Machine Learning to determine that it is possible to schedule a pickup of a replacement or an upgraded product at the time of pickup. Thus, it could schedule the pickup of the replacement or the upgrade product at or near the time of the pickup from the customer. The actual exchange can be done through the same driver of the same logistic partner, who is scheduled to pickup the replacement item first and then perform the exchange at the customer pickup location. This allows the PRAE system to schedule and perform an actual exchange (or an equivalent of an in-store replacement) at the time and place of pickup from the customer.

As discussed above in connection with FIG. 8, the order management computerizes system builds an Automated Aggregation (Process 1214), where return orders are aggregated by: (1) retail partner; (2) final destination; (3) P/U date/time; and (4) P/U location. The aggregated orders are processed and optimized (Process 1215) by the order management computerized system based on: (a) a proximity/mileage limit for pickup or delivery; and (b) size and weight limit of the pickup product(s). The aggregated and optimized information is then transmitted to the Gig partner.

The Gig partner (referring to the pickup and delivery partner) determines whether it will accept the pickup and delivery of the batch of orders that has been aggregated and optimized for the Gig partner by the order management computerized system. A computer process of the Gig partner system executes computer instructions that process (Process 1202) the aggregated and optimized batch order based on such factors as: (1) lead time; (2) capacity; (3) price; and (4) performance record.

The computerized system of the Gig partner then determines (Process 1203) whether to accept the offered optimized batch for pickup and delivery. If not accepted, the Gig partner returns the notice back to the order management computerized system (Process 1204) for resubmit processing. The Gig partner processes each batch of aggregated and optimized orders, and, if it accepts the batch order, it builds a route for pickup and delivery and sends it as input (Process 1209) back to the order management computerized system. The order management computerized system creates a digital bin id, assigns the drop-off and return route to Gig Driver (Process 1217), and then returns the route data to the Gig partner for processing the pickup and delivery of the products in the batch/route.

As discussed above in connection with FIG. 11, the events and status code changes are communicated to the retail partner from the order management computerized system via API Webhook (Process 1230), and the order details and updates feed to the customer Admin Panel (Process 1232), as shown in FIG. 12A. The order management computerized system also sends an email or SMS to the customer with a cancel/reschedule option (Process 1236). The cancel/reschedule option may also be sent as a 2-day prior reminder (Process 1237) and/or 1-day prior reminder (Process 1238).

Referring to FIG. 12B, the Gig partner assigns (Process 1241) a driver to the accepted route, and a driver is dispatched to the pickup address on the accepted order, within the time window specified in the order. At the same time the Gig partner may send a notification (Process 1242) to the order management computerized system, which may then send a related notification to the customer (Process 1243), indicating that the "driver is on the way" in the SMS or email to the customer.

In certain embodiments, the driver or the system may be directed to perform product validation through a visual or digital scan at the point of pickup to determine (Process 1245) whether the products to be picked up are all located there and whether the description of the products (in the pickup order) matches the actual products. If products in the pickup order are not located or the description does not match, the driver or the customer at the pickup location may connect (Process 1247) with the customer care assistance of the order management system, where the driver may be assisted in finding the correct products for pickup. If not found, the system initiates (Process 1246) a "did not find address" or "did not find product" notifications to the retail partner and customer (Processes 1248A-1249A and 1248B-1249B, respectfully).

If the pickup products are located and match the description (Process 1245), the driver may be instructed to perform an image capture with SKU verification option (Process 1250) of the products. This process may further create a unique Digital Fingerprint of the transaction and/or the product and allow better verification and tracking of the picked-up product.

Once the image capture is completed and a unique Digital Fingerprint is created, the system checks whether the quantity of the picked-up products matches (Process 1251) the order. If there is no match, the error process (Process 1252) is initiated through the order management computerized system to the customer and retailer (Processes 1253A and 1253B, respectfully), indicating that there was a quantity mismatch between the number of products in the pickup order and the actual number of products that were at the pickup location.

Alternatively, if the quantity of the picked-up products matches the quantity in the order, the Gig partner signals that the "pick up is complete" (Process 1254) in the driver app. Moreover, if the driver was able to complete the pickup, and the number and description of products matched the picked-up products, then the order management computerized system updates (Process 1255) the record id for the picked-up product and adds it to the Digital bin, and also sends "pick up completed" notifications to the retail partner and the customer (Processes 1256A and 1256B, respectively).

The Gig partner computer automatically repeatedly checks whether the driver has more products for pickup (Process 1257) at the same location until all intended products are found and match the description. If there are no more products that are indicated to be picked up at the same address or location, and the products were not found, the Gig partner computerized system checks (Process 1258) whether there are more products from a prior pickup. If so, the system then dispatches the driver to the drop-off address (Process 1265) within the time window in the order.

If it is determined that there are no other pickups on the same route (Process 1260), then all the pickups are completed, and the driver is dispatched to the drop-off address (Process 1265). If it is determined at step 1260 (FIG. 12C) that not all pickups have been completed by the driver on the same route, then the Gig partner initiates (Process 1261) the "missed pickup" processing by the order management computerized system, which transmits "missed pickup" notifications to the retail partner and the customer (Processes 1262 and 1263, respectfully).

At the drop-off location, the driver may present (Process 1266) the ID code to the receiving clerk and hand over the delivered products. The Gig partner system then indicates (Process 1267) on the driver app that the drop off was completed, and transmits a notice to the order management computerized system. If the "drop-off complete" notice was received (Process 1268) by the order management computerized system, it adds a tracking number or receiver number (Process 1270) to the Digital Bin, triggers the "route complete" indication and closes the Digital Bin 1271. If the "drop-off complete" notice is not received, the order management computerized system initiates (Process 1269) a missed drop process.

Once the "route complete" trigger on the order management computerized system closes the Digital Bin (after completion of the drop off), the order details and updates (Process 1272) are sent to the Customer Admin Panel of the retail partner, and the events and status code changes are communicated (Process 1273) via API Webhook to the retail partner.

In view of the foregoing detailed description of various embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernible from the description herein by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention.

It should be appreciated that the present invention includes any and all possible combinations of the disclosed subject matter. Thus, even if a particular embodiment is not discussed as including a feature in a different embodiment, the present invention embodies such feature in any suitable embodiment, and accordingly such particular embodiment optionally includes said particular features of said different embodiment. Also, various steps or substeps may be omitted, and various additional steps and substeps may be added, as appropriate.

Unless otherwise stated, the singular includes the plural in further variations or embodiments, and the plural includes the singular in other further variations or embodiments of any particular described embodiment, feature, element, step or other thing mentioned herein.

It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

Having described the present invention including various features and variations thereof, it is intended that the appended claims be interpreted as including the embodiments described herein, the alternatives mentioned above, and all equivalents thereto.

What is claimed is:

1. A method for automatically processing a return or exchange of a product from a customer, comprising:
   receiving an electronic request to initiate return of a product by a customer to a retailer of the product;
   obtaining product information identifying information about the product;
   associating the return initiation request for the product with return information comprising the product information, a pickup address, a pickup time window, customer information and drop-off information;
   automatically aggregating the requested return with other return requests and optimizing the aggregated requests for returns of multiple products;
   generating pickup and delivery route data for the aggregated and optimized requests;
   receiving an acceptance notification from a transport service provider regarding the generated pickup and delivery route data;
   receiving from the transport service provider a first notification regarding pickup status of one or more products corresponding to one or more products in the aggregated and optimized requests, the first notification including validation data pertaining to inspection information of one or more of said products;
   after receiving the first notification, creating a unique digital fingerprint record for each picked-up product and updating a digital bin having a plurality of digital fingerprints for the products associated with the generated pickup and delivery route data accepted by the transport service provider;
   transmitting a first status to the customer or the retailer at or near a time of receiving the first notification, the first status including at least data indicating successful pickup of one or more products by the transport service provider;

receiving a second notification regarding drop-off status by the transport service provider of the one or more products at a drop-off location, the second notification representing receipt of the one or more products at the drop-off location by the transport service provider, the drop-off location not representing a location associated with the retailer;

updating the digital bin and assigning a tracking number or receiver number after the second notification is received; and transmitting a second status to the retailer after receiving the second notification, the second status including product status data corresponding to the validation data pertaining to inspection of the product and information regarding refund or exchange processing can be initiated if not already initiated by the retailer.

2. The method of claim 1, comprising:

determining whether the associated return initiation request and return information includes minimum data requirements comprising an address for pickup of the product, an address for delivery of the product, the product information, customer contact information, and a time window for product pickup;

generating and electronically transmitting, when the minimum data requirements are not met, a request to resubmit the electronic request to initiate return of the product with additional information; and generating, when the minimum data requirements are met, a database record id for the request and performing aggregation of the requested return with other return requests and optimization of the aggregated returns.

3. The method of claim 1, wherein automatically aggregating the requested return with other return requests and optimizing the aggregated requests for returns of multiple products is based on a computerized analysis of an authorized retail partner, a delivery destination, a pickup date and time, and pickup location data.

4. The method of claim 1, wherein automatically aggregating the requested return with other return requests and optimizing the aggregated requests for returns of multiple products is based on a computerized evaluation of proximity and mileage limits and size or weight limits set by one or more delivery partners.

5. The method of claim 1, comprising:

communicating with at least one driver and determining whether the driver has a designated bag that includes a unique ID that corresponds to the product to be picked up by the driver;

directing the driver to obtain the designated bag at an indicated location prior to product pickup if it is determined that the driver does not have the designated bag; and providing product pickup instructions to the driver after receiving confirmation that the driver obtained the designated bag.

6. The method of claim 1, wherein the first notification received from the transport service provider represents completion of an inspection by a driver who picked up the product, the inspection including taking one or more photographs of the product by the driver, the first notification including data corresponding to the one or more photographs of the product.

7. The method of claim 1, comprising receiving from the transport service provider a unique ID representing a unique container into which a driver of the transport service provider has placed the product picked up by the driver; and associating the return initiation request of the product with the received unique ID.

8. The method of claim 1, wherein the received second notification includes second validation data pertaining to a second inspection of the product conducted at the drop-off location; and the product status data in the transmitted second status to the retailer pertains to the second inspection of the product conducted at the drop-off location, and includes an indication of whether or not refund or exchange processing can be initiated depending on results of the second inspection.

9. The method of claim 1, comprising:

initiating, if the first notification is received but the second notification is not received within a predetermined time period, an audit and tracking of the product; and generating and transmitting product status notifications to the customer and retailer indicating that the product has been picked up from the customer but has not been delivered.

10. The method of claim 1, comprising:

receiving from the transport service provider an incomplete pickup notification comprising data that indicates that one or more products to be picked up were not found at the pickup address or that indicates that a quantity of products picked up at the pickup address does not match a quantity of products included in the aggregated and optimized requests corresponding to products to be picked up at the pickup address; and generating and transmitting product status notifications to the customer and the retailer indicating information contained in the incomplete pickup notification received from the transport service provider.

11. The method of claim 1, comprising:

receiving and updating a chain-of-custody information for the product after receiving the first notification; and receiving and updating the chain-of-custody information for the product after receiving the second notification.

12. The method of claim 11, comprising:

storing the updated chain-of-custody information for the product in a non-fungible-token (NFT) on a blockchain, wherein the NFT is uniquely associated with the product.

13. The method of claim 1, comprising:

performing image recognition processing of the product at pickup; and performing automated product authentication using the recognized product image.

14. An automated system for processing a return or exchange of a product from a customer, comprising:

at least one processor executing computer instructions stored in a tangible, non-transitory computer readable storage medium causing the processor to:

receive an electronic request to initiate return of a product by a customer to a retailer of the product;

obtain product information identifying information about the product, associate the return initiation request for the product with return information comprising the product information, a pickup address, a pickup time window, customer information and drop-off information;

automatically aggregate the requested return with other return requests and optimizing the aggregated requests for returns of multiple products;

generate pickup and delivery route data for the aggregated and optimized requests;

receive an acceptance notification from a transport service provider regarding the generated pickup and delivery route data;

receive from the transport service provider a first notification regarding pickup status of one or more products corresponding to one or more products in the aggregated and optimized requests, the first notification including validation data pertaining to inspection information of one or more of said products;

create, after the first notification is received, a unique digital fingerprint record for each picked-up product and update a digital bin having a plurality of digital fingerprints for the products associated with the generated pickup and delivery route data accepted by the transport service provider;

transmit a first status to the customer or the retailer at or near a time of receiving the first notification, the first status including at least data indicating successful pickup of one or more products by the transport service provider;

receive a second notification regarding drop-off status by the transport service provider of the one or more products at a drop-off location, the second notification representing receipt of the one or more products at the drop-off location by the transport service provider, the drop-off location not representing a location associated with the retailer;

update the digital bin and assigning a tracking number or receiver number after the second notification is received; and transmit a second status to the retailer after receiving the second notification, the second status including product status data corresponding to the validation data pertaining to inspection of the product and information regarding refund or exchange processing can be initiated if not already initiated by the retailer.

15. The automated system of claim 14, wherein the processor executes computer instructions stored in the tangible, non-transitory computer readable storage medium to cause the processor to:

determine whether the associated return initiation request and return information includes minimum data requirements comprising an address for pickup of the product, an address for delivery of the product, the product information, customer contact information, and a time window for product pickup;

generate and electronically transmit, when the minimum data requirements are not met, a request to resubmit the electronic request to initiate return of the product with additional information; and generate, when the minimum data requirements are met, a database record id for the request and perform aggregation of the requested return with other return requests and optimization of the aggregated returns.

16. The automated system of claim 14, wherein the processor executes computer instructions stored in the tangible, non-transitory computer readable storage medium to cause the processor to automatically aggregate the requested return with other return requests and optimize the aggregated requests for returns of multiple products based on a computerized analysis of an authorized retail partner, a delivery destination, a pickup date and time, and pickup location data.

17. The automated system of claim 14, wherein the processor executes computer instructions stored in the tangible, non-transitory computer readable storage medium to cause the processor to automatically aggregate the requested return with other return requests and optimize the aggregated requests for returns of multiple products based on a computerized evaluation of proximity and mileage limits and size or weight limits set by one or more delivery partners.

18. The automated system of claim 14, wherein the processor executes computer is stored in the tangible, non-transitory computer readable storage medium to cause the processor to:

communicate with at least one driver and determine whether the driver has a designated bag that includes a unique ID that corresponds to the product to be picked up by the driver;

direct the driver to obtain the designated bag at an indicated location prior to product pickup if it is determined that the driver does not have the designated bag; and provide product pickup instructions to the driver after receiving confirmation that the driver obtained the designated bag.

19. The automated system of claim 14, wherein the first notification received from the transport service provider represents completion of an inspection by a driver who picked up the product, the inspection including taking one or more photographs of the product by the driver, the first notification including data corresponding to the one or more photographs of the product.

20. The automated system of claim 14, wherein the processor executes computer instructions stored in the tangible, non-transitory computer readable storage medium to cause the processor to:

receive from the transport service provider a unique ID representing a unique container into which a driver of the transport service provider has placed the product picked up by the driver; and associate the return initiation request of the product with the received unique ID.

21. The automated system of claim 14, wherein the received second notification includes second validation data pertaining to a second inspection of the product conducted at the drop-off location; and the product status data in the transmitted second status to the retailer pertains to the second inspection of the product conducted at the drop-off location, and includes an indication of whether or not refund or exchange processing can be initiated depending on results of the second inspection.

22. The automated system of claim 14, wherein the processor executes computer instructions stored in the tangible, non-transitory computer readable storage medium to cause the processor to:

initiate, if the first notification is received but the second notification is not received within a predetermined time period, an audit and tracking of the product; and generate and transmit product status notifications to the customer and retailer indicating that the product has been picked up from the customer but has not been delivered.

23. The automated system of claim 14, wherein the processor executes computer instructions stored in the tangible, non-transitory computer readable storage medium to cause the processor to:

receive from the transport service provider an incomplete pickup notification comprising data that indicates that one or more products to be picked up were not found at the pickup address or that indicates that a quantity of products picked up at the pickup address does not match a quantity of products included in the aggregated and optimized requests corresponding to products to be picked up at the pickup address; and generate and transmit product status notifications to the customer and the retailer indicating information contained in the incomplete pickup notification received from the transport service provider.

24. The automated system of claim 14, wherein the processor executes computer instructions stored in the tangible, non-transitory computer readable storage medium to cause the processor to:

receive and update a chain-of-custody information for the product after receiving the first notification; and receive and update the chain-of-custody information for the product after receiving the second notification.

25. The automated system of claim 24, wherein the processor executes computer instructions stored in the tangible, non-transitory computer readable storage medium to cause the processor to:

store the updated chain-of-custody information for the product in a non-fungible-token (NFT) on a blockchain, wherein the NFT is uniquely associated with the product.

26. The automated system of claim 14, wherein the processor executes computer instructions stored in the tangible, non-transitory computer readable storage medium to cause the processor to:

perform image recognition processing of the product at pickup; and perform automated product authentication using the recognized product image.

27. A method of automatically processing return of products, comprising:

receiving an aggregated and optimized set of return requests for returns of multiple products;

evaluating the received set of return requests based on one or more conditions, and generating a route for the pickup and delivery of the set of products to be returned;

transmitting an acceptance notification and a pickup and delivery route data for the accepted set of product returns;

selecting one or more pickup drivers for the accepted set of returns, the drivers being selected from a prospective pool of drivers based at least partially on a driver's proximity to the location of the products;

receiving a confirmation from the driver who is assigned to the pickup for the route;

dispatching the assigned driver to the pickup location;

transmitting inspection information to the driver regarding at least one product to be picked up;

transmitting a first notification after the driver performs a visual inspection of the picked up product based on inspection instructions, takes an image of the picked up product, places the product into a designated container including an ID code associated therewith, and scans the ID code using a mobile device;

checking whether the driver has more products to be picked-up on the assigned route;

directing, if all products on the assigned route have been picked up, the driver to at least one drop-off location within a set time period for the drop-off; and transmitting a second notification after the driver has completed drop-off, and after receiving the ID code on the container, where the products have been dropped-off, the second notification indicating that an exchange or refund of the product may be commenced by the retailer if not already initiated.

28. The method of claim 27, comprising:

cancelling the product pickup if the driver does not send an indication of completing the pickup in a predetermined time interval, or when the driver sends a cancellation request prior to driving to the pickup location;

reassigning the product pickup to another driver if the received notification is a rejection or cancellation of the pickup or assigned route; and sending notifications after at least one driver has been assigned to the route for pickup, after the assigned driver has completed the pickup and after the assigned driver completed the drop-off.

* * * * *